US011727555B2

(12) United States Patent
Affleck et al.

(10) Patent No.: US 11,727,555 B2
(45) Date of Patent: Aug. 15, 2023

(54) RIG POWER SYSTEM EFFICIENCY OPTIMIZATION THROUGH IMAGE PROCESSING

(71) Applicant: Saudi Arabian Oil Company, Dhahran (SA)

(72) Inventors: Michael Affleck, Aberdeenshire (GB); Arturo Magana Mora, Dhahran (SA); Chinthaka Pasan Gooneratne, Dhahran (SA); William Contreras Otalvora, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 168 days.

(21) Appl. No.: 17/185,688

(22) Filed: Feb. 25, 2021

(65) Prior Publication Data

US 2022/0270227 A1   Aug. 25, 2022

(51) Int. Cl.
  *G06T 7/00*   (2017.01)
  *G06N 3/08*   (2023.01)
  *H04N 5/38*   (2006.01)
  *E21B 41/00*   (2006.01)

(52) U.S. Cl.
  CPC ........... *G06T 7/001* (2013.01); *G06N 3/08* (2013.01); *H04N 5/38* (2013.01); *E21B 41/00* (2013.01); *G06T 2200/24* (2013.01); *G06T 2207/10016* (2013.01); *G06T 2207/20081* (2013.01); *G06T 2207/30164* (2013.01)

(58) Field of Classification Search
  None
  See application file for complete search history.

(56) References Cited

U.S. PATENT DOCUMENTS

| | | |
|---|---|---|
| 891,957 A | 6/1908 | Schubert |
| 2,043,225 A | 6/1936 | Armentrout et al. |
| 2,110,913 A | 3/1938 | Lowrey |
| 2,227,729 A | 1/1941 | Lynes |
| 2,286,673 A | 6/1942 | Douglas |
| 2,305,062 A | 12/1942 | Church et al. |
| 2,344,120 A | 3/1944 | Baker |
| 2,757,738 A | 9/1948 | Ritchey |

(Continued)

FOREIGN PATENT DOCUMENTS

| | | |
|---|---|---|
| CA | 1226325 | 9/1987 |
| CA | 2249432 | 9/2005 |

(Continued)

OTHER PUBLICATIONS

PCT International Search Report and Written Opinion in International Appln. No. PCT/US2022/017694, dated May 20, 2022, 12 pages.

(Continued)

*Primary Examiner* — Leon Viet Q Nguyen
(74) *Attorney, Agent, or Firm* — Fish & Richardson P.C.

(57) ABSTRACT

A method includes receiving, by a computer system, a video of a visible state of a component of a generator, the generator powering at least a portion of a rig equipment system at a wellsite. The computer system can determine an operational parameter based on the visible state of the component of the generator imaged in the video, and can transmit the operational parameter to an output device.

23 Claims, 6 Drawing Sheets

(56) References Cited

U.S. PATENT DOCUMENTS

| | | |
|---|---|---|
| 2,509,608 A | 5/1950 | Penfield |
| 2,688,369 A | 9/1954 | Broyles |
| 2,690,897 A | 10/1954 | Clark |
| 2,719,363 A | 10/1955 | Richard et al. |
| 2,763,314 A | 9/1956 | Gill |
| 2,795,279 A | 6/1957 | Erich |
| 2,799,641 A | 7/1957 | Gordon |
| 2,805,045 A | 9/1957 | Goodwin |
| 2,822,150 A | 2/1958 | Muse et al. |
| 2,841,226 A | 7/1958 | Conrad et al. |
| 2,899,000 A | 8/1959 | Medders et al. |
| 2,927,775 A | 3/1960 | Hildebrandt |
| 3,016,244 A | 1/1962 | Friedrich et al. |
| 3,028,915 A | 4/1962 | Jennings |
| 3,071,399 A | 1/1963 | Cronin |
| 3,087,552 A | 4/1963 | Graham |
| 3,102,599 A | 9/1963 | Hillbum |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,220,478 A | 11/1965 | Kinzbach |
| 3,236,307 A | 2/1966 | Brown |
| 3,253,336 A | 5/1966 | Brown |
| 3,268,003 A | 8/1966 | Essary |
| 3,331,439 A | 7/1967 | Lawrence |
| 3,428,125 A | 2/1969 | Parker |
| 3,468,373 A | 9/1969 | Smith |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,656,564 A | 4/1972 | Brown |
| 3,696,866 A | 10/1972 | Dryden |
| 3,839,791 A | 10/1974 | Feamster |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,064,211 A | 12/1977 | Wood |
| 4,084,637 A | 4/1978 | Todd |
| 4,129,437 A | 12/1978 | Taguchi et al. |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,191,493 A | 3/1980 | Hansson et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,334,928 A | 6/1982 | Hara |
| 4,337,653 A | 7/1982 | Chauffe |
| 4,343,651 A | 8/1982 | Yazu et al. |
| 4,354,559 A | 10/1982 | Johnson |
| 4,365,677 A | 12/1982 | Owens |
| 4,373,581 A | 2/1983 | Toellner |
| 4,394,170 A | 7/1983 | Sawaoka et al. |
| 4,396,062 A | 8/1983 | Iskander |
| 4,412,585 A | 11/1983 | Bouck |
| 4,413,642 A | 11/1983 | Smith et al. |
| 4,449,585 A | 5/1984 | Bridges et al. |
| 4,457,365 A | 7/1984 | Kasevich et al. |
| 4,464,993 A | 8/1984 | Porter |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,501,337 A | 2/1985 | Dickinson et al. |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,557,327 A | 12/1985 | Kinley et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,636,934 A | 1/1987 | Schwendemann |
| RE32,345 E | 3/1987 | Wood |
| 4,660,636 A | 4/1987 | Rundell et al. |
| 4,705,108 A | 11/1987 | Little et al. |
| 4,817,711 A | 4/1989 | Jearnbey |
| 5,012,863 A | 5/1991 | Springer |
| 5,018,580 A | 5/1991 | Skipper |
| 5,037,704 A | 8/1991 | Nakai et al. |
| 5,055,180 A | 10/1991 | Klaila |
| 5,068,819 A | 11/1991 | Misra et al. |
| 5,070,952 A | 12/1991 | Neff |
| 5,074,355 A | 12/1991 | Lennon |
| 5,082,054 A | 1/1992 | Kiamanesh |
| 5,092,056 A | 3/1992 | Deaton |
| 5,107,705 A | 4/1992 | Wraight et al. |
| 5,107,931 A | 4/1992 | Valka et al. |
| 5,228,518 A | 7/1993 | Wilson et al. |
| 5,236,039 A | 8/1993 | Edelstein et al. |
| 5,278,550 A | 1/1994 | Rhein-Knudsen et al. |
| 5,387,776 A | 2/1995 | Preiser |
| 5,388,648 A | 2/1995 | Jordan, Jr. |
| 5,429,198 A | 7/1995 | Anderson et al. |
| 5,490,598 A | 2/1996 | Adams |
| 5,501,248 A | 3/1996 | Kiest, Jr. |
| 5,523,158 A | 6/1996 | Kapoor et al. |
| 5,595,252 A | 1/1997 | O'Hanlon |
| 5,603,070 A | 2/1997 | Cerutti et al. |
| 5,690,826 A | 11/1997 | Cravello |
| 5,803,186 A | 9/1998 | Berger et al. |
| 5,803,666 A | 9/1998 | Keller |
| 5,813,480 A | 9/1998 | Zaleski, Jr. et al. |
| 5,853,049 A | 12/1998 | Keller |
| 5,890,540 A | 4/1999 | Pia et al. |
| 5,899,274 A | 5/1999 | Frauenfeld et al. |
| 5,947,213 A | 9/1999 | Angle |
| 5,955,666 A | 9/1999 | Mullins |
| 5,958,236 A | 9/1999 | Bakula |
| RE36,362 E | 11/1999 | Jackson |
| 5,987,385 A | 11/1999 | Varsamis et al. |
| 6,008,153 A | 12/1999 | Kukino et al. |
| 6,012,526 A | 1/2000 | Jennings et al. |
| 6,032,742 A | 3/2000 | Tomlin et al. |
| 6,041,860 A | 3/2000 | Nazzal et al. |
| 6,047,239 A | 4/2000 | Berger et al. |
| 6,096,436 A | 8/2000 | Inspektor |
| 6,170,531 B1 | 1/2001 | Jung et al. |
| 6,173,795 B1 | 1/2001 | McGarian et al. |
| 6,189,611 B1 | 2/2001 | Kasevich |
| 6,254,844 B1 | 7/2001 | Takeuchi et al. |
| 6,268,726 B1 | 7/2001 | Prammer |
| 6,269,953 B1 | 8/2001 | Seyffert et al. |
| 6,287,079 B1 | 9/2001 | Gosling et al. |
| 6,290,068 B1 | 9/2001 | Adams et al. |
| 6,305,471 B1 | 10/2001 | Milloy |
| 6,325,216 B1 | 12/2001 | Seyffert et al. |
| 6,328,111 B1 | 12/2001 | Bearden et al. |

(56) References Cited

U.S. PATENT DOCUMENTS

| | | |
|---|---|---|
| 6,330,913 B1 | 12/2001 | Langseth et al. |
| 6,354,371 B1 | 3/2002 | O'Blanc |
| 6,371,302 B1 | 4/2002 | Adams et al. |
| 6,413,399 B1 | 7/2002 | Kasevich |
| 6,443,228 B1 | 9/2002 | Aronstam |
| 6,454,099 B1 | 9/2002 | Adams et al. |
| 6,469,278 B1 | 10/2002 | Boyce |
| 6,510,947 B1 | 1/2003 | Schulte et al. |
| 6,534,980 B2 | 2/2003 | Toufaily et al. |
| 6,544,411 B2 | 4/2003 | Varandaraj |
| 6,561,269 B1 | 5/2003 | Brown et al. |
| 6,571,877 B1 | 6/2003 | Van Bilderbeek |
| 6,607,080 B2 | 8/2003 | Winkler et al. |
| 6,612,384 B1 | 9/2003 | Singh et al. |
| 6,622,554 B2 | 9/2003 | Manke et al. |
| 6,623,850 B2 | 9/2003 | Kukino et al. |
| 6,629,610 B1 | 10/2003 | Adams et al. |
| 6,637,092 B1 | 10/2003 | Menzel |
| 6,678,616 B1 | 1/2004 | Winkler et al. |
| 6,722,504 B2 | 4/2004 | Schulte et al. |
| 6,741,000 B2 | 5/2004 | Newcomb |
| 6,761,230 B2 | 7/2004 | Cross et al. |
| 6,814,141 B2 | 11/2004 | Huh et al. |
| 6,827,145 B2 | 12/2004 | Fotland et al. |
| 6,845,818 B2 | 1/2005 | Tutuncu et al. |
| 6,850,068 B2 | 2/2005 | Chernali et al. |
| 6,895,678 B2 | 5/2005 | Ash et al. |
| 6,912,177 B2 | 6/2005 | Smith |
| 6,971,265 B1 | 12/2005 | Sheppard et al. |
| 6,993,432 B2 | 1/2006 | Jenkins et al. |
| 7,000,777 B2 | 2/2006 | Adams et al. |
| 7,013,992 B2 | 3/2006 | Tessari et al. |
| 7,048,051 B2 | 5/2006 | McQueen |
| 7,063,155 B2 | 6/2006 | Ruttley |
| 7,086,463 B2 | 8/2006 | Ringgenberg et al. |
| 7,091,460 B2 | 8/2006 | Kinzer |
| 7,109,457 B2 | 9/2006 | Kinzer |
| 7,115,847 B2 | 10/2006 | Kinzer |
| 7,124,819 B2 | 10/2006 | Ciglenec et al. |
| 7,131,498 B2 | 11/2006 | Campo et al. |
| 7,216,767 B2 | 5/2007 | Schulte et al. |
| 7,255,582 B1 | 8/2007 | Liao |
| 7,312,428 B2 | 12/2007 | Kinzer |
| 7,322,776 B2 | 1/2008 | Webb et al. |
| 7,331,385 B2 | 2/2008 | Symington |
| 7,376,514 B2 | 5/2008 | Habashy et al. |
| 7,387,174 B2 | 6/2008 | Lurie |
| 7,395,878 B2 | 7/2008 | Reitsma et al. |
| 7,445,041 B2 | 11/2008 | O'Brien |
| 7,455,117 B1 | 11/2008 | Hall et al. |
| 7,461,693 B2 | 12/2008 | Considine et al. |
| 7,484,561 B2 | 2/2009 | Bridges |
| 7,539,548 B2 | 5/2009 | Dhawan |
| 7,562,708 B2 | 7/2009 | Cogliandro et al. |
| 7,629,497 B2 | 12/2009 | Pringle |
| 7,631,691 B2 | 12/2009 | Symington et al. |
| 7,647,980 B2 | 1/2010 | Corre et al. |
| 7,650,269 B2 | 1/2010 | Rodney |
| 7,677,673 B2 | 3/2010 | Tranquilla et al. |
| 7,730,625 B2 | 6/2010 | Blake |
| 7,779,903 B2 | 8/2010 | Bailey et al. |
| 7,789,148 B2 | 9/2010 | Rayssiguier et al. |
| 7,828,057 B2 | 11/2010 | Kearl et al. |
| 7,909,096 B2 | 3/2011 | Clark et al. |
| 7,951,482 B2 | 5/2011 | Ichinose et al. |
| 7,980,392 B2 | 7/2011 | Varco |
| 8,067,865 B2 | 11/2011 | Savant |
| 8,096,349 B2 | 1/2012 | Considine et al. |
| 8,176,977 B2 | 5/2012 | Keller |
| 8,210,256 B2 | 7/2012 | Bridges et al. |
| 8,237,444 B2 | 8/2012 | Simon |
| 8,245,792 B2 | 8/2012 | Trinh et al. |
| 8,275,549 B2 | 9/2012 | Sabag et al. |
| 8,286,734 B2 | 10/2012 | Hannegan et al. |
| 8,484,858 B2 | 7/2013 | Brannigan et al. |
| 8,511,404 B2 | 8/2013 | Rasheed |
| 8,526,171 B2 | 9/2013 | Wu et al. |
| 8,528,668 B2 | 9/2013 | Rasheed |
| 8,567,491 B2 | 10/2013 | Lurie |
| 8,636,063 B2 | 1/2014 | Ravi et al. |
| 8,678,087 B2 | 3/2014 | Schultz et al. |
| 8,683,859 B2 | 4/2014 | Godager |
| 8,776,609 B2 | 7/2014 | Dria et al. |
| 8,794,062 B2 | 8/2014 | DiFoggio et al. |
| 8,824,240 B2 | 9/2014 | Roberts et al. |
| 8,884,624 B2 | 11/2014 | Homan et al. |
| 8,925,213 B2 | 1/2015 | Sallwasser |
| 8,960,215 B2 | 2/2015 | Cui et al. |
| 8,973,680 B2 | 3/2015 | MacKenzie |
| 9,051,810 B1 | 6/2015 | Cuffe et al. |
| 9,109,429 B2 | 8/2015 | Xu et al. |
| 9,217,291 B2 | 12/2015 | Batarseh |
| 9,217,323 B2 | 12/2015 | Clark |
| 9,222,350 B2 | 12/2015 | Vaughn et al. |
| 9,238,953 B2 | 1/2016 | Fleming et al. |
| 9,238,961 B2 | 1/2016 | Bedouet |
| 9,250,339 B2 | 2/2016 | Ramirez |
| 9,328,574 B2 | 5/2016 | Sehsah |
| 9,353,589 B2 | 5/2016 | Hekelaar |
| 9,355,440 B1 | 5/2016 | Chen et al. |
| 9,394,782 B2 | 7/2016 | DiGiovanni et al. |
| 9,435,159 B2 | 9/2016 | Scott |
| 9,464,487 B1 | 10/2016 | Zurn |
| 9,470,059 B2 | 10/2016 | Zhou |
| 9,492,885 B2 | 11/2016 | Zediker et al. |
| 9,494,010 B2 | 11/2016 | Flores |
| 9,494,032 B2 | 11/2016 | Roberson et al. |
| 9,528,366 B2 | 12/2016 | Selman et al. |
| 9,562,987 B2 | 2/2017 | Guner et al. |
| 9,567,819 B2 | 2/2017 | Cavender et al. |
| 9,617,815 B2 | 4/2017 | Schwartze et al. |
| 9,664,011 B2 | 5/2017 | Kruspe et al. |
| 9,702,211 B2 | 7/2017 | Tinnen |
| 9,731,471 B2 | 8/2017 | Schaedler et al. |
| 9,739,141 B2 | 8/2017 | Zeng et al. |
| 9,757,796 B2 | 9/2017 | Sherman et al. |
| 9,765,609 B2 | 9/2017 | Chemali et al. |
| 9,845,653 B2 | 12/2017 | Hannegan et al. |
| 9,903,010 B2 | 2/2018 | Doud et al. |
| 9,976,381 B2 | 5/2018 | Martin et al. |
| 10,000,983 B2 | 6/2018 | Jackson et al. |
| 10,113,408 B2 | 10/2018 | Pobedinski et al. |
| 10,174,577 B2 | 1/2019 | Leuchtenberg et al. |
| 10,227,859 B2 | 3/2019 | Richards et al. |
| 10,233,372 B2 | 3/2019 | Ramasamy et al. |
| 10,329,877 B2 | 6/2019 | Simpson et al. |
| 10,352,125 B2 | 7/2019 | Frazier |
| 10,392,910 B2 | 8/2019 | Walton et al. |
| 10,394,193 B2 | 8/2019 | Li et al. |
| 10,544,640 B2 | 1/2020 | Hekelaar |
| 10,551,800 B2 | 2/2020 | Li et al. |
| 10,641,079 B2 | 5/2020 | Aljubran et al. |
| 10,673,238 B2 | 6/2020 | Boone et al. |
| 10,927,618 B2 | 2/2021 | Albahrani et al. |
| 10,999,946 B2 | 5/2021 | Li et al. |
| 11,008,816 B2 | 5/2021 | Zhan et al. |
| 2002/0066563 A1 | 6/2002 | Langseth et al. |
| 2003/0052098 A1 | 3/2003 | Kim et al. |
| 2003/0159776 A1 | 8/2003 | Graham |
| 2003/0230526 A1 | 12/2003 | Okabayshi et al. |
| 2004/0182574 A1 | 9/2004 | Sarmad et al. |
| 2004/0256103 A1 | 12/2004 | Batarseh |
| 2005/0022987 A1 | 2/2005 | Green et al. |
| 2005/0092523 A1 | 5/2005 | McCaskill et al. |
| 2005/0199386 A1 | 9/2005 | Kinzer |
| 2005/0259512 A1 | 11/2005 | Mandal |
| 2006/0016592 A1 | 1/2006 | Wu |
| 2006/0076347 A1 | 4/2006 | Kinzer |
| 2006/0102625 A1 | 5/2006 | Kinzer |
| 2006/0106541 A1 | 5/2006 | Hassan et al. |
| 2006/0144620 A1 | 7/2006 | Cooper |
| 2006/0185843 A1 | 8/2006 | Smith |
| 2006/0248949 A1 | 11/2006 | Gregory et al. |
| 2006/0249307 A1 | 11/2006 | Ritter |

(56) References Cited

U.S. PATENT DOCUMENTS

| | | |
|---|---|---|
| 2007/0000662 A1 | 1/2007 | Symington et al. |
| 2007/0017669 A1 | 1/2007 | Lurie |
| 2007/0108202 A1 | 5/2007 | Kinzer |
| 2007/0131591 A1 | 6/2007 | Pringle |
| 2007/0137852 A1 | 6/2007 | Considine et al. |
| 2007/0137858 A1 | 6/2007 | Considine et al. |
| 2007/0153626 A1 | 7/2007 | Hayes et al. |
| 2007/0175633 A1 | 8/2007 | Kosmala |
| 2007/0181301 A1 | 8/2007 | O'Brien |
| 2007/0187089 A1 | 8/2007 | Bridges |
| 2007/0193744 A1 | 8/2007 | Bridges |
| 2007/0204994 A1 | 9/2007 | Wimmersperg |
| 2007/0261844 A1 | 11/2007 | Cogliandro et al. |
| 2007/0289736 A1 | 12/2007 | Kearl et al. |
| 2008/0007421 A1 | 1/2008 | Liu et al. |
| 2008/0047337 A1 | 2/2008 | Chemali et al. |
| 2008/0053652 A1 | 3/2008 | Corre et al. |
| 2008/0073079 A1 | 3/2008 | Tranquilla et al. |
| 2008/0173443 A1 | 7/2008 | Symington et al. |
| 2008/0173480 A1 | 7/2008 | Annaiyappa et al. |
| 2008/0190822 A1 | 8/2008 | Young |
| 2008/0308282 A1 | 12/2008 | Standridge et al. |
| 2008/0312892 A1 | 12/2008 | Heggemann |
| 2009/0153354 A1 | 6/2009 | Daussin |
| 2009/0164125 A1 | 6/2009 | Bordakov et al. |
| 2009/0178809 A1 | 7/2009 | Jeffryes et al. |
| 2009/0183875 A1 | 7/2009 | Rayssiguier et al. |
| 2009/0255689 A1 | 10/2009 | Kriesels et al. |
| 2009/0259446 A1 | 10/2009 | Zhang et al. |
| 2009/0288820 A1 | 11/2009 | Barron et al. |
| 2010/0006339 A1 | 1/2010 | Desai |
| 2010/0089583 A1 | 4/2010 | Xu et al. |
| 2010/0186955 A1 | 7/2010 | Saasen et al. |
| 2010/0276209 A1 | 11/2010 | Yong et al. |
| 2010/0282511 A1 | 11/2010 | Maranuk |
| 2011/0011576 A1 | 1/2011 | Cavender et al. |
| 2011/0031026 A1 | 2/2011 | Oxford et al. |
| 2011/0058916 A1 | 3/2011 | Toosky |
| 2011/0120732 A1 | 5/2011 | Lurie |
| 2011/0155368 A1 | 6/2011 | El-Khazindar |
| 2011/0220416 A1 | 9/2011 | Rives |
| 2012/0012319 A1 | 1/2012 | Dennis |
| 2012/0075615 A1 | 3/2012 | Niclass et al. |
| 2012/0111578 A1 | 5/2012 | Tverlid |
| 2012/0132418 A1 | 5/2012 | McClung |
| 2012/0132468 A1 | 5/2012 | Scott et al. |
| 2012/0152543 A1 | 6/2012 | Davis |
| 2012/0169841 A1 | 6/2012 | Chemali et al. |
| 2012/0173196 A1 | 7/2012 | Miszewski |
| 2012/0181020 A1 | 7/2012 | Barron et al. |
| 2012/0186817 A1 | 7/2012 | Gibson et al. |
| 2012/0222854 A1 | 9/2012 | McClung, III |
| 2012/0227983 A1 | 9/2012 | Lymberopoulous et al. |
| 2012/0273187 A1 | 11/2012 | Hall |
| 2012/0325564 A1 | 12/2012 | Vaughn et al. |
| 2013/0008653 A1 | 1/2013 | Schultz et al. |
| 2013/0008671 A1 | 1/2013 | Booth |
| 2013/0025943 A1 | 1/2013 | Kumar |
| 2013/0037268 A1 | 2/2013 | Kleefisch et al. |
| 2013/0068525 A1 | 3/2013 | Digiovanni |
| 2013/0076525 A1 | 3/2013 | Vu et al. |
| 2013/0125642 A1 | 5/2013 | Parfitt |
| 2013/0126164 A1 | 5/2013 | Sweatman et al. |
| 2013/0146359 A1 | 6/2013 | Koederitz |
| 2013/0191029 A1 | 7/2013 | Heck, Sr. |
| 2013/0213637 A1 | 8/2013 | Kearl |
| 2013/0255936 A1 | 10/2013 | Statoilydro et al. |
| 2013/0269945 A1 | 10/2013 | Mulholland et al. |
| 2013/0308424 A1 | 11/2013 | Kumar |
| 2014/0034144 A1 | 2/2014 | Cui et al. |
| 2014/0047776 A1 | 2/2014 | Scott et al. |
| 2014/0083771 A1 | 3/2014 | Clark |
| 2014/0090846 A1 | 4/2014 | Deutch |
| 2014/0132468 A1 | 5/2014 | Scott et al. |
| 2014/0183143 A1 | 7/2014 | Cady et al. |
| 2014/0231068 A1 | 8/2014 | Isaksen |
| 2014/0231075 A1 | 8/2014 | Springett et al. |
| 2014/0231147 A1 | 8/2014 | Bozso et al. |
| 2014/0238658 A1 | 8/2014 | Wilson et al. |
| 2014/0246235 A1 | 9/2014 | Yao |
| 2014/0251593 A1 | 9/2014 | Oberg et al. |
| 2014/0251894 A1 | 9/2014 | Larson et al. |
| 2014/0265337 A1 | 9/2014 | Harding et al. |
| 2014/0270793 A1 | 9/2014 | Bradford |
| 2014/0278111 A1 | 9/2014 | Gerrie et al. |
| 2014/0291023 A1 | 10/2014 | Edbury |
| 2014/0300895 A1 | 10/2014 | Pope et al. |
| 2014/0326506 A1 | 11/2014 | Difoggio |
| 2014/0333754 A1 | 11/2014 | Graves et al. |
| 2014/0360778 A1 | 12/2014 | Batarseh |
| 2014/0375468 A1 | 12/2014 | Wilkinson et al. |
| 2015/0020908 A1 | 1/2015 | Warren |
| 2015/0021240 A1 | 1/2015 | Wardell et al. |
| 2015/0027724 A1 | 1/2015 | Symms |
| 2015/0075714 A1 | 3/2015 | Sun et al. |
| 2015/0083422 A1 | 3/2015 | Pritchard |
| 2015/0091737 A1 | 4/2015 | Richardson et al. |
| 2015/0101864 A1 | 4/2015 | May |
| 2015/0129306 A1 | 5/2015 | Coffman et al. |
| 2015/0159467 A1 | 6/2015 | Hartman et al. |
| 2015/0211362 A1 | 7/2015 | Rogers |
| 2015/0267500 A1 | 9/2015 | Van Dongen |
| 2015/0284833 A1 | 10/2015 | Hsiao et al. |
| 2015/0290878 A1 | 10/2015 | Houben et al. |
| 2015/0300151 A1 | 10/2015 | Mohaghegh |
| 2016/0053572 A1 | 2/2016 | Snoswell |
| 2016/0053604 A1 | 2/2016 | Abbassian |
| 2016/0076357 A1 | 3/2016 | Hbaieb |
| 2016/0115783 A1 | 4/2016 | Zeng et al. |
| 2016/0130928 A1 | 5/2016 | Torrione et al. |
| 2016/0153240 A1 | 6/2016 | Braga et al. |
| 2016/0160106 A1 | 6/2016 | Jamison et al. |
| 2016/0237810 A1 | 8/2016 | Beaman et al. |
| 2016/0247316 A1 | 8/2016 | Whalley et al. |
| 2016/0339517 A1 | 11/2016 | Joshi et al. |
| 2016/0356125 A1 | 12/2016 | Bello et al. |
| 2017/0051785 A1 | 2/2017 | Cooper |
| 2017/0077705 A1 | 3/2017 | Kuttel et al. |
| 2017/0161885 A1 | 6/2017 | Parmeshwar et al. |
| 2017/0234104 A1 | 8/2017 | James |
| 2017/0292376 A1 | 10/2017 | Kumar et al. |
| 2017/0314335 A1 | 11/2017 | Kosonde et al. |
| 2017/0314369 A1 | 11/2017 | Rosano et al. |
| 2017/0328196 A1 | 11/2017 | Shi et al. |
| 2017/0328197 A1 | 11/2017 | Shi et al. |
| 2017/0332482 A1 | 11/2017 | Hauslmann |
| 2017/0342776 A1 | 11/2017 | Bullock et al. |
| 2017/0350201 A1 | 12/2017 | Shi et al. |
| 2017/0350241 A1 | 12/2017 | Shi |
| 2018/0010030 A1 | 1/2018 | Ramasamy et al. |
| 2018/0010419 A1 | 1/2018 | Livescu et al. |
| 2018/0029942 A1 | 2/2018 | Ishida |
| 2018/0171772 A1 | 6/2018 | Rodney |
| 2018/0171774 A1 | 6/2018 | Ringer et al. |
| 2018/0177064 A1 | 6/2018 | Van Pol et al. |
| 2018/0187498 A1 | 7/2018 | Soto et al. |
| 2018/0265416 A1 | 9/2018 | Ishida et al. |
| 2018/0266226 A1 | 9/2018 | Batarseh et al. |
| 2018/0315111 A1 | 11/2018 | Alvo et al. |
| 2018/0326679 A1 | 11/2018 | Weisenberg et al. |
| 2018/0334883 A1 | 11/2018 | Williamson |
| 2018/0363404 A1 | 12/2018 | Faugstad |
| 2019/0049054 A1 | 2/2019 | Gunnarsson et al. |
| 2019/0078626 A1 | 3/2019 | Silsson |
| 2019/0090056 A1 | 3/2019 | Rexach et al. |
| 2019/0100988 A1 | 4/2019 | Brian et al. |
| 2019/0101872 A1 | 4/2019 | Li |
| 2019/0145183 A1 | 5/2019 | Potash |
| 2019/0194519 A1 | 6/2019 | Amanullah |
| 2019/0211664 A1* | 7/2019 | Billingham ............ E21B 47/00 |
| 2019/0227499 A1 | 7/2019 | Li et al. |
| 2019/0257180 A1 | 8/2019 | Kriesels et al. |
| 2019/0267805 A1 | 8/2019 | Kothuru et al. |
| 2019/0282089 A1 | 9/2019 | Wang |

(56) References Cited

U.S. PATENT DOCUMENTS

| | | | |
|---|---|---|---|
| 2019/0323332 A1 | 10/2019 | Cuellar et al. | |
| 2020/0032638 A1 | 1/2020 | Ezzeddine | |
| 2020/0125040 A1 | 4/2020 | Li et al. | |
| 2020/0182043 A1 | 6/2020 | Downey et al. | |
| 2020/0224525 A1* | 7/2020 | Parmeshwar | E21B 47/007 |
| 2020/0240258 A1 | 7/2020 | Stokely et al. | |
| 2020/0248546 A1 | 8/2020 | Torrione et al. | |
| 2020/0370381 A1 | 11/2020 | Al-Rubaii et al. | |
| 2020/0371495 A1 | 11/2020 | Al-Rubaii et al. | |
| 2020/0409321 A1* | 12/2020 | Sanchez Del Valle | H02J 3/381 |
| 2021/0032934 A1 | 2/2021 | Zhan et al. | |
| 2021/0032935 A1 | 2/2021 | Zhan et al. | |
| 2021/0032936 A1 | 2/2021 | Zhan et al. | |
| 2021/0034029 A1 | 2/2021 | Zhan et al. | |
| 2021/0174131 A1* | 6/2021 | Schwartz | G06V 10/82 |

FOREIGN PATENT DOCUMENTS

| | | |
|---|---|---|
| CA | 2537585 | 8/2006 |
| CA | 2669721 | 7/2011 |
| CA | 2594042 | 8/2012 |
| CN | 101079591 | 11/2007 |
| CN | 200989202 | 12/2007 |
| CN | 102493813 | 6/2012 |
| CN | 203232293 | 10/2013 |
| CN | 104295448 | 1/2015 |
| CN | 204627586 | 9/2015 |
| CN | 106119763 | 11/2016 |
| CN | 107462222 | 12/2017 |
| CN | 108240191 | 7/2018 |
| CN | 109437920 | 3/2019 |
| CN | 110571475 | 12/2019 |
| DE | 102008001607 | 11/2009 |
| DE | 102011008809 | 7/2012 |
| DE | 102012022453 | 5/2014 |
| DE | 102013200450 | 7/2014 |
| DE | 102012205757 | 8/2014 |
| EP | 2317068 | 5/2011 |
| EP | 2574722 | 4/2013 |
| EP | 2737173 | 6/2014 |
| EP | 3034778 | 6/2016 |
| EP | 3333141 | 6/2018 |
| FR | 3051699 | 12/2017 |
| GB | 2124855 | 2/1984 |
| GB | 2155519 | 9/1985 |
| GB | 2357305 | 6/2001 |
| GB | 2399515 | 9/2004 |
| GB | 2422125 | 7/2006 |
| GB | 2466376 | 6/2010 |
| GB | 2484166 | 4/2012 |
| GB | 2532967 | 6/2016 |
| JP | 2009067609 | 4/2009 |
| JP | 4275896 | 6/2009 |
| JP | 5013156 | 8/2012 |
| JP | 2013110910 | 6/2013 |
| NO | 343139 | 11/2018 |
| NO | 20161842 | 5/2019 |
| RU | 2282708 | 8/2006 |
| RU | 122531 | 11/2012 |
| WO | WO 1995035429 | 12/1995 |
| WO | WO 1997021904 | 6/1997 |
| WO | WO 2000025942 | 5/2000 |
| WO | WO 2000031374 | 6/2000 |
| WO | WO 2001042622 | 6/2001 |
| WO | WO 2002020944 | 3/2002 |
| WO | WO 2002068793 | 9/2002 |
| WO | WO 03/042494 | 5/2003 |
| WO | WO 2004042185 | 5/2004 |
| WO | WO 2007049026 | 5/2007 |
| WO | WO 2007070305 | 6/2007 |
| WO | WO 2008146017 | 12/2008 |
| WO | WO 2009020889 | 2/2009 |
| WO | WO 2009113895 | 9/2009 |
| WO | WO 2010054353 | 5/2010 |
| WO | WO 2010105177 | 9/2010 |
| WO | WO 2011038170 | 3/2011 |
| WO | WO 2011042622 | 6/2011 |
| WO | WO 2011130159 | 10/2011 |
| WO | WO 2011139697 | 11/2011 |
| WO | WO 2012007407 | 1/2012 |
| WO | WO 2013016095 | 1/2013 |
| WO | WO 2013148510 | 10/2013 |
| WO | WO 2014127035 | 8/2014 |
| WO | WO 2015072971 | 5/2015 |
| WO | WO 2015095155 | 6/2015 |
| WO | WO 2016178005 | 11/2016 |
| WO | WO 2017011078 | 1/2017 |
| WO | WO 2017027105 | 2/2017 |
| WO | WO 2017132297 | 8/2017 |
| WO | WO 2017196303 | 11/2017 |
| WO | WO 2018022198 | 2/2018 |
| WO | WO 2018046361 | 3/2018 |
| WO | WO 2018167022 | 9/2018 |
| WO | WO 2018169991 | 9/2018 |
| WO | WO 2019027830 | 2/2019 |
| WO | WO 2019040091 | 2/2019 |
| WO | WO 2019055240 | 3/2019 |
| WO | WO 2019089926 | 5/2019 |
| WO | WO 2019108931 | 6/2019 |
| WO | WO 2019169067 | 9/2019 |
| WO | WO 2019236288 | 12/2019 |
| WO | WO 2019246263 | 12/2019 |

OTHER PUBLICATIONS

U.S. Appl. No. 16/708,834, Li et al., Dec. 10, 2019.
U.S. Appl. No. 16/708,872, Li et al., Dec. 10, 2019.
U.S. Appl. No. 16/524,935, Zhan et al., Jul. 29, 2019.
U.S. Appl. No. 16/708,865, Li et al., Dec. 10, 2019.
U.S. Appl. No. 16/831,426, Li et al., Mar. 26, 2020.
U.S. Appl. No. 16/831,483, Li et al., Mar. 26, 2020.
U.S. Appl. No. 16/831,559, Li et al., Mar. 26, 2020.
U.S. Appl. No. 16/897,794, Li et al., Jun. 10, 2020.
U.S. Appl. No. 16/897,801, Li et al., Jun. 10, 2020.
U.S. Appl. No. 16/897,805, Li et al., Jun. 10, 2020.
"IADC Dull Grading for PDC Drill Bits," Beste Bit, SPE/IADC 23939, 1992, 52 pages.
Akersolutions, "Aker MH CCTC Improving Safety," AkerSolutions, Jan. 2008, 12 pages.
Anwar et al., "Fog computing: an overview of big IoT data analytics," ID 7157192, Wiley, Hindawi, Wireless communications and mobile computing, May 2018, 2018: 1-22, 23 pages.
Artymiuk et al., "The new drilling control and monitoring system," Acta Montanistica Slovaca, Sep. 2004, 9:3 (145-151), 7 pages.
Ashby et al., "Coiled Tubing Conveyed Video Camera and Multi-Arm Caliper Liner Damage Diagnostics Post Plug and Perf Frac," SPE-172622-MS, Society of Petroleum Engineers (SPE), presented at the SPE Middle East Oil & Gas Show and Conference, Mar. 8-11, 2015, 12 pages.
Bilal et al., "Potentials, trends, and prospects in edge technologies: Fog, cloudlet, mobile edge, and micro data centers," Computer Networks, Elsevier, Oct. 2017, 130: 94-120, 27 pages.
Carpenter, "Advancing Deepwater Kick Detection," JPT, 68:5, May 2016, 2 pages.
Caryotakis, "The klystron: A microwave source of surprising range and endurance." The American Physical Society, Division of Plasma Physics Conference in Pittsburg, PA, Nov. 1997, 14 pages.
Commer et al., "New advances in three-dimensional controlled-source electromagnetic inversion," Geophys. J. Int., 2008, 172: 513-535, 23 pages.
Corona et al., "Novel Washpipe-Free ICD Completion With Dissolvable Material," OTC-28863-MS, presented at the Offshore Technology Conference, Houston, TX, Apr. 30-May 3, 2018, 2018, OTC, 10 pages.
Decker et al., "Opportunities for Waste Heat Recovery at Contingency Bases," Construction Engineering Research Laboratory (CERL), US Army Corps of Engineers, ERDC, Apr. 2016, 61 pages.
Dickens et al., "An LED array-based light induced fluorescence sensor for real-time process and field monitoring," Sensors and Actuators B: Chemical, Elsevier, Apr. 2011, 158:1 (35-42), 8 pages.

(56) References Cited

OTHER PUBLICATIONS

Dong et al., "Dual Substitution and Spark Plasma Sintering to Improve Ionic Conductivity of Garnet Li7La3Zr2O12," Nanomaterials, 9:721, 2019, 10 pages.
Downholediagnostic.com [online] "Acoustic Fluid Level Surveys," retrieved from URL <https://www.downholediagnostic.com/fluid-level> retrieved on Mar. 27, 2020, available on or before 2018, 13 pages.
edition.cnn.com [online], "Revolutionary gel is five times stronger than steel," retrieved from URL <https://edition.cnn.com/style/article/hydrogel-steel-japan/index.html>, retrieved on Apr. 2, 2020, available on or before Jul. 16, 2017, 6 pages.
Fjetland et al., "Kick Detection and Influx Size Estimation during Offshore Drilling Operations using Deep Learning," INSPEC 18992956, IEEE, presented at the 2019 14th IEEE Conference on Industrial Electronics and Applications (ICIEA), Jun. 19-21, 2019, 6 pages.
Gemmeke and Ruiter, "3D ultrasound computer tomography for medical imagining," Nuclear Instruments and Methods in Physics Research Section A:580 (1057-1065), Oct. 1, 2007, 9 pages.
gryphonoilfield.com [online], "Gryphon Oilfield Services, Echo Dissolvable Fracturing Plug," available on or before Jun. 17, 2020, retrieved on Aug. 20, 2020, retrieved from URL <https://www.gryphonoilfield.com/wp-content/uploads/2018/09/Echo-Series-Dissolvable-Fracturing-Plugs-8-23-2018-1.pdf>, 1 page.
halliburton.com [online], "Drill Bits and Services Solutions Catalogs," retrieved from URL: <https://www.halliburton.com/content/dam/ps/public/sdbs/sdbs_contents/Books_and_Catalogs/web/DBS-Solution.pdf> on Sep. 26, 2019, 2014, 64 pages.
Hopkin, "Factor Affecting Cuttings Removal during Rotary Drilling," Journal of Petroleum Technology 19.06, Jun. 1967, 8 pages.
Ji et al., "Submicron Sized Nb Doped Lithium Garnet for High Ionic Conductivity Solid Electrolyte and Performance of All Solid-State Lithium Battery," doi:10.20944/preprints201912.0307.v1, Dec. 2019, 10 pages.
Johnson et al., "Advanced Deepwater Kick Detection," IADC/SPE 167990, presented at the 2014 IADC/SPE Drilling Conference and Exhibition, Mar. 4-6, 2014, 10 pages.
Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.
King et al., "Atomic layer deposition of TiO2 films on particles in a fluidized bed reactor," Power Technology, 183:3, Apr. 2008, 8 pages.
Lafond et al., "Automated Influx and Loss Detection System Based on Advanced Mud Flow Modeling," SPE-195835-MS, Society of Petroleum Engineers (SPE), presented at the SPE Annual Technical Conference and Exhibition, Sep. 30- Oct. 2, 2019, 11 pages.
Li et al., 3D Printed Hybrid Electrodes for Lithium-ion Batteries, Missouri University of Science and Technology, Washington State University; ECS Transactions, 77 (11) 1209-1218 (2017), 11 pages.
Liu et al., "Flow visualization and measurement in flow field of a torque converter," Mechanic automation and control Engineering, Second International Conference on IEEE, Jul. 15, 2011, 1329-1331.
Liu et al., "Superstrong micro-grained polycrystalline diamond compact through work hardening under high pressure," Appl. Phys. Lett. Feb. 2018, 112: 6 pages.
Liu, et al. "Hardness of Polycrystalline Wurtsite Boron Nitride (wBN) Compacts," Scientific Reports, Jul. 2019, 9(1):1-6, 6 pages.
Luo et al., "Simple Charts to Determine Hole Cleaning Requirements in Deviated Wells," IADC/SPE 27486, SPE/IADC Drilling Conference, Society of Petroleum Engineers, Feb. 15-18, 1994, 7 pages.
Maurer, "The Perfect Cleaning Theory of Rotary Drilling," Journal of Petroleum Technology 14.11, 1962, 5 pages.
nature.com [online], "Mechanical Behavior of a Soft Hydrogel Reinforced with Three-Dimensional Printed Microfibre Scaffolds," retrieved from URL <https://www.nature.com/articles/s41598-018-19502-y>, retrieved on Apr. 2, 2020, available on or before Jan. 19, 2018, 47 pages.
Nuth, "Smart oil field distributed computing," The Industrial Ethernet Book, Nov. 2014, 85:14 (1-3), 3 pages.
Olver, "Compact Antenna Test Ranges," Seventh International Conference on Antennas and Propagation IEEE, Apr. 15-18, 1991, 10 pages.
Paiaman et al., "Effect of Drilling Fluid Properties on Rate Penetration," Nafta 60:3, 2009, 6 pages.
Parini et al., "Chapter 3: Antenna measurements," in Theory and Practice of Modem Antenna Range Measurements, IET editorial, 2014, 30 pages.
Pavkovic et al., "Oil drilling rig diesel power-plant fuel efficiency improvement potentials through rule-based generator scheduling and utilization of battery energy storage system," Energy Conversion and Management, Science Direct, May 2016, 121: 194-211, 18 pages.
petrowiki.org [online], "Hole Cleaning," retrieved from URL <http://petrowiki.org/Hole_cleaning#Annular-fluid_velocity>, retrieved on Jan. 25, 2019, 8 pages.
petrowiki.org [online], "Kicks," Petrowiki, available on or before Jun. 26, 2015, retrieved on Jan. 24, 2018, retrieved from URL <https://petrowiki.org/Kicks>, 6 pages.
Ranjbar, "Cutting Transport in Inclined and Horizontal Wellbore," University of Stavanger, Faculty of Science and Technology, Master's Thesis, Jul. 6, 2010, 137 pages.
Rasi, "Hole Cleaning in Large, High-Angle Wellbores," IADC/SPE 27464, Society of Petroleum Engineers (SPE), presented at the 1994 SPE/IADC Drilling Conference, Feb. 15-18, 1994, 12 pages.
rigzone.com [online], "How does Well Control Work?" Rigzone, available on or before 1999, retrieved on Jan. 24, 2019, retrieved from URL <https://www.rigzone.com/training/insight.asp?insight_id=304&c_id>, 5 pages.
Robinson and Morgan, "Effect of Hole Cleaning on Drilling Rate Performance," Paper Aade-04-Df-Ho-42, AADE 2004 Drilling Fluids Conference, Houston, Texas, Apr. 6-7, 2004, 7 pages.
Robinson, "Economic Consequences of Poor Solids and Control," AADE 2006 Fluids Conference and Houston, Texas, Apr. 11-12, 2006, 9 pages.
Rubaii et al., "A new robust approach for hole cleaning to improve rate of penetration," SPE 192223-MS, Society of Petroleum Engineers (SPE), presented at the SPE Kingdom of Saudi Arabia Annual Technical Symposium and Exhibition, Apr. 23-26, 2018, 40 pages.
Ruiter et al., "3D ultrasound computer tomography of the breast: A new era?" European Journal of Radiology 81S1, Sep. 2012, 2 pages.
sageoiltools.com [online] "Fluid Level & Dynamometer Instruments for Analysis due Optimization of Oil and Gas Wells," retrieved from URL <http://www.sageoiltools.com/>, retrieved on Mar. 27, 2020, available on or before 2019, 3 pages.
Schlumberger, "CERTIS: Retrievable, single-trip, production-level isolation system," www.slb.com/CERTIS, 2017, 2 pages.
Schlumberger, "First Rigless ESP Retrieval and Replacement with Slickline, Offshore Congo: Zeitecs Shuttle System Eliminates Need to Mobilize a Workover Rig," slb.com/zeitecs, 2016, 1 page.
Schlumberger, "The Lifting Business," Offshore Engineer, Mar. 2017, 1 page.
Schlumberger, "Zeitecs Shuttle System Decreases ESP Replacement Time by 87%: Customer ESP riglessly retrieved in less than 2 days on coiled tubing," slb.com/zeitecs, 2015, 1 page.
Schlumberger, "Zeitecs Shuttle System Reduces Deferred Production Even Before ESP is Commissioned, Offshore Africa: Third Party ESP developed fault during installation and was retrieved on rods, enabling operator to continue running tubing without waiting on replacement," slb.com/zeitecs, 2016, 2 pages.
Schlumberger, "Zeitecs Shuttle: Rigless ESP replacement system," Brochure, 8 pages.
Schlumberger, "Zeitecs Shuttle: Rigless ESP replacement system," Schlumberger, 2017, 2 pages.
Sifferman et al., "Drilling cutting transport in full scale vertical annuli," Journal of Petroleum Technology 26.11, 48th Annual Fall Meeting of the Society of Petroleum Engineers of AIME, Las Vegas, Sep. 30-Oct. 3, 1973, 12 pages.

(56) References Cited

OTHER PUBLICATIONS slb.com [online] "Technical Paper: ESP Retrievable Technology: A Solution to Enhance ESP Production While Minimizing Costs," SPE 156189 presented in 2012, retrieved from URL <http://www.slb.com/resources/technical_papers/artificial_lift/156189.aspx>, retrieved on Nov. 2, 2018, 1 pages.
slb.com [online], "Zeitecs Shuttle Rigless ESP Replacement System," retrieved from URL <http://www.slb.com/services/production/artificial_lift/submersible/zeitecs-shuttle.aspx?t=3>, available on or before May 31, 2017, retrieved on Nov. 2, 2018, 3 pages.
Sulzer Metco, "An Introduction to Thermal Spray," 4, 2013, 24 pages.
Takahashi et al., "Degradation study on materials for dissolvable frac plugs," URTeC 2901283, presented at the Unconventional Resources Technology Conference, Houston, Texas, Jul. 23-25, 2018, 9 pages.
tervesinc.com [online], "Tervalloy™ Degradable Magnesium Alloys," available on or before Jun. 12, 2016, via Internet Archive: Wayback Machine URL <https://web.archive.org/web/20160612114602/http://tervesinc.com/media/Terves_8-Pg_Brochure.pd>, retrieved on Aug. 20, 2020, <http://tervesinc.com/media/Terves_8-Pg_Brochure.pdf>, 8 pages.
Tobenna, "Hole Cleaning Hydraulics," Universitetet o Stavanger, Faculty of Science and Technology, Master's Thesis, Jun. 15, 2010, 75 pages.
Utkin et al., "Shock Compressibility and Spallation Strength of Cubic Modification of Polycrystalline Boron Nitride," High Temperature, 2009, 47(5):628-634, 7 pages.
Wastu et al., "The effect of drilling mud on hole cleaning in oil and gas industry," Journal of Physics: Conference Series, Dec. 2019, 1402:2, 7 pages.
Weatherford, "RFID Advanced Reservoir Management System Optimizes Injection Well Design, Improves Reservoir Management," Weatherford.com, 2013, 2 pages.
Wei et al., "The Fabrication of All-Solid-State Lithium-Ion Batteries via Spark Plasma Sintering," Metals, 7: 372, 2017, 9 pages.
Wellbore Service Tools: Retrievable tools, "RTTS Packer," Halliburton: Completion Tools, 2017, 4 pages.
wikipedia.org [online] "Optical Flowmeters," retrieved from URL <https://en.wikipedia.org/wiki/Flow_measurement#Optical flowmeters>, retrieved on Mar. 27, 2020, available on or before Jan. 2020, 1 page.
wikipedia.org [online] "Ultrasonic Flow Meter," retrieved from URL <https://en.wikipedia.org/wiki/Ultrasonic_flow_meter>, retrieved on Mar. 27, 2020, available on or before Sep. 2019, 3 pages.
wikipedia.org [online], "Atomic layer deposition," available on or before Sep. 10, 2014, via Internet Archive: Wayback Machine URL <http://web.archive.org/web/20140910101023/http://en.wikipedia.org/wiki/Atomic_layer_deposition>, retrieved on Feb. 9, 2021, <https://en.wikipedia.org/wiki/Atomic_layer_deposition>.
wikipedia.org [online], "Chemical vapor deposition," available on or before Apr. 11, 2013, via Internet Archive: Wayback Machine URL <http://web.archive.org/web/20130411025512/http://en.wikipedia.org:80/wiki/Chemical_Vapor_Deposition>, retrieved on Feb. 9, 2021, URL <https://en.wikipedia.org/wiki/Chemical_vapor_deposition>, 12 pages.
wikipedia.org [online], "Surface roughness," retrieved from URL <https://en.wikipedia.org/wiki/Surface_roughness>, retrieved on Apr. 2, 2020, available on or before Oct. 2017, 6 pages.
Williams and Bruce, "Carrying Capacity of Drilling Muds," Journal of Petroleum Technology, 3.04, 192, 1951, 10 pages.
Xia et al., "A Cutting Concentration Model of a Vertical Wellbore Annulus in Deep-water Drilling Operation and its Application," Applied Mechanics and Materials, 101-102, Sep. 27, 2011, 5 pages.
Xue et al., "Spark plasma sintering plus heat-treatment of Ta-doped Li7La3Zr2O12 solid electrolyte and its ionic conductivity," Mater. Res. Express 7 (2020) 025518, 8 pages.
Zhan et al. "Effect of β-to-α Phase Transformation on the Microstructural Development and Mechanical Properties of Fine-Grained Silicon Carbide Ceramics," Journal of the American Ceramic Society 84.5, May 2001, 6 pages.
Zhan et al. "Single-wall carbon nanotubes as attractive toughening agents in alumina-based nanocomposites," Nature Materials 2.1, Jan. 2003, 6 pages.
Zhan et al., "Atomic Layer Deposition on Bulk Quantities of Surfactant Modified Single-Walled Carbon Nanotubes," Journal of American Ceramic Society, 91:3, Mar. 2008, 5 pages.
Zhang et al, "Increasing Polypropylene High Temperature Stability by Blending Polypropylene-Bonded Hindered Phenol Antioxidant," Macromolecules, 51:5 (1927-1936), 2018, 10 pages.
Zhu et al., "Spark Plasma Sintering of Lithium Aluminum Germanium Phosphate Solid Electrolyte and its Electrochemical Properties," University of British Columbia; Nanomaterials, 9, 1086, 2019, 10 pages.

* cited by examiner

RIG POWER SYSTEM EFFICIENCY OPTIMIZATION THROUGH IMAGE PROCESSING

TECHNICAL FIELD

This disclosure relates to wellbore drilling and completion.

BACKGROUND

In hydrocarbon production, a wellbore is drilled into a hydrocarbon-rich geological formation. Completion equipment can then be installed in the well and hydrocarbons produced from the well.

Drilling and production rig equipment at a wellsite can require large amounts of power in order to operate. Such power is typically supplied by on-site generator banks which include multiple individual generators.

SUMMARY

This disclosure describes technologies relating to rig power system efficiency optimization through image processing.

Certain aspects of the subject matter herein can be implemented as a method including receiving, by a computer system, a video of a visible state of a component of a generator, the generator powering at least a portion of a rig equipment system at a wellsite. The computer system can determine an operational parameter based on the visible state of the component of the generator imaged in the video, and can transmit the operational parameter to an output device.

An aspect combinable with any of the other aspects can include the following features. The computer is configured to implement a machine learning model. The computer system determines the operational parameter by receiving, by the machine learning model, training data comprising historical images of the visible state of the component of the generator and historical measured operational parameters. The machine learning model correlates the historical images with corresponding historical measured operational parameters and determines the operational parameter based on a comparison of the video of the visible state with the historical images.

An aspect combinable with any of the other aspects can include the following features. The operational parameter is a percentage of a maximum revolutions-per-minute (RPM) of the generator.

An aspect combinable with any of the other aspects can include the following features. The component of the generator is an exhaust flapper, and the visible state is a position of the exhaust flapper moving in response to an exhaust stream from the generator.

An aspect combinable with any of the other aspects can include the following features. The position of the exhaust flapper is determined based on a visible cross-sectional area of the exhaust flapper.

An aspect combinable with any of the other aspects can include the following features. The generator is included in a generator bank that includes a plurality of generators, each comprising a respective component. The generator bank powers at least the portion of the rig equipment system at the wellsite. The computer system receives a video of a plurality of visible states that include a visible state of the respective component of each of the plurality of generators. The computer system determines a respective operational parameter for each of the generators based on the plurality of visible states and determines a power availability status of the generator bank based on the respective operational parameter of each of the plurality of generators.

An aspect combinable with any of the other aspects can include the following features. The computer system determines power demand parameters of a plurality of components of the portion of the rig equipment system, transmits the power availability status of the generator bank and the power demand parameters to the output device, and optimizes a power efficiency of the rig equipment system based on the power availability status of the generator bank and the power demand parameters.

An aspect combinable with any of the other aspects can include the following features. A camera is disposed at or proximate to the wellsite, and the camera captures the video. The video is transmitted to the computer system.

An aspect combinable with any of the other aspects can include the following features. The transmitting is via a wireless connection.

An aspect combinable with any of the other aspects can include the following features. The video includes multiple images in sequence of the visible state of the component of the generator.

Certain aspects of the subject matter herein can be implemented as a system for optimizing the efficiency of a rig equipment system at a wellsite. The system includes a camera configured to capture a video of a visible state of a component of a generator, the generator powering at least a portion of the rig equipment system. The system also includes a computer system including one or more processors and a non-transitory computer-readable medium storing computer instructions executable by the one or more processors to perform operations. The operations include receiving the video of the visible state of the component of a generator, determining an operational parameter based on the visible state of the component of the generator imaged in the video, and transmitting the operational parameter to an output device.

An aspect combinable with any of the other aspects can include the following features. The computer is configured to implement a machine learning model. The machine learning model is configured to receive training data comprising historical images of the visible state of the component of the generator and historical measured operational parameters, correlate the historical images with corresponding historical measured operational parameters, and determine the operational parameter based on a comparison of the video of the visible state with the historical images.

An aspect combinable with any of the other aspects can include the following features. The operational parameter is a percentage of a maximum revolutions-per-minute (RPM) of the generator.

An aspect combinable with any of the other aspects can include the following features. The component of the generator is an exhaust flapper, and the visible state is a position of the exhaust flapper moving in response to an exhaust stream from the generator.

An aspect combinable with any of the other aspects can include the following features. The position of the exhaust flapper is determined based on a visible cross-sectional area of the exhaust flapper.

An aspect combinable with any of the other aspects can include the following features. The generator is included in a generator bank including a plurality of generators. Each generator includes a respective component, and the generator bank powers at least the portion of the rig equipment system at the wellsite. The operations also include receiving a video of a plurality of visible states, the plurality of visible states comprising a visible state of the respective component of each of the plurality of generators, determining a respective operational parameter for each of the generators based on the plurality of visible states, and determining a power availability status of the generator bank based on the respective operational parameter of each of the plurality of generators.

An aspect combinable with any of the other aspects can include the following features. The operations also include determining power demand parameters of a plurality of components of the portion of the rig equipment system, and transmitting the power availability status of the generator bank and the power demand parameters to the output device.

An aspect combinable with any of the other aspects can include the following features. The output device includes a display screen with a graphical user interface configured to display the power availability status of the generator bank and the power demand parameters of the plurality of components of the portion of the rig equipment system.

An aspect combinable with any of the other aspects can include the following features. The video includes multiple images in sequence of the visible state of the component of the generator.

An aspect combinable with any of the other aspects can include the following features. The camera is configured to wirelessly transmit the video to the computer system.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes a system and method for optimizing rig power system efficiency. Through capture and processing of video images of generator components and the use of machine learning and deep-learning to correlate such images with operational parameters, such operational parameters and related well and power-usage conditions (including supply and demand from individual components) can be quickly, easily, and cost-effectively monitored and acted upon by an operator.

Optimization of generator usage and generator load at a wellsite has numerous benefits and advantages. Optimization of generator usage and load can minimize the usage of diesel or other fuel, thus reducing costs and saving time and resources. Optimization can also reduce the amount of potentially harmful generator emissions such as carbon dioxide, nitrogen oxides, and solid particulates.

Optimization can reduce maintenance tasks associated with servicing and repair with lower replacement parts cost, where units are run both more efficiently and in many cases for less hours (and resulting less fuel usage and less emissions) than non-optimized equipment.

In some embodiments, the system can provide operators alarm and/or diagnostic data for poorly performing individual generators in the bank such as a leaking exhaust, an overheating component, or a vibration imbalance caused by failed engine mounts or a failure or malfunction of the engine internal components.

Figure 1:
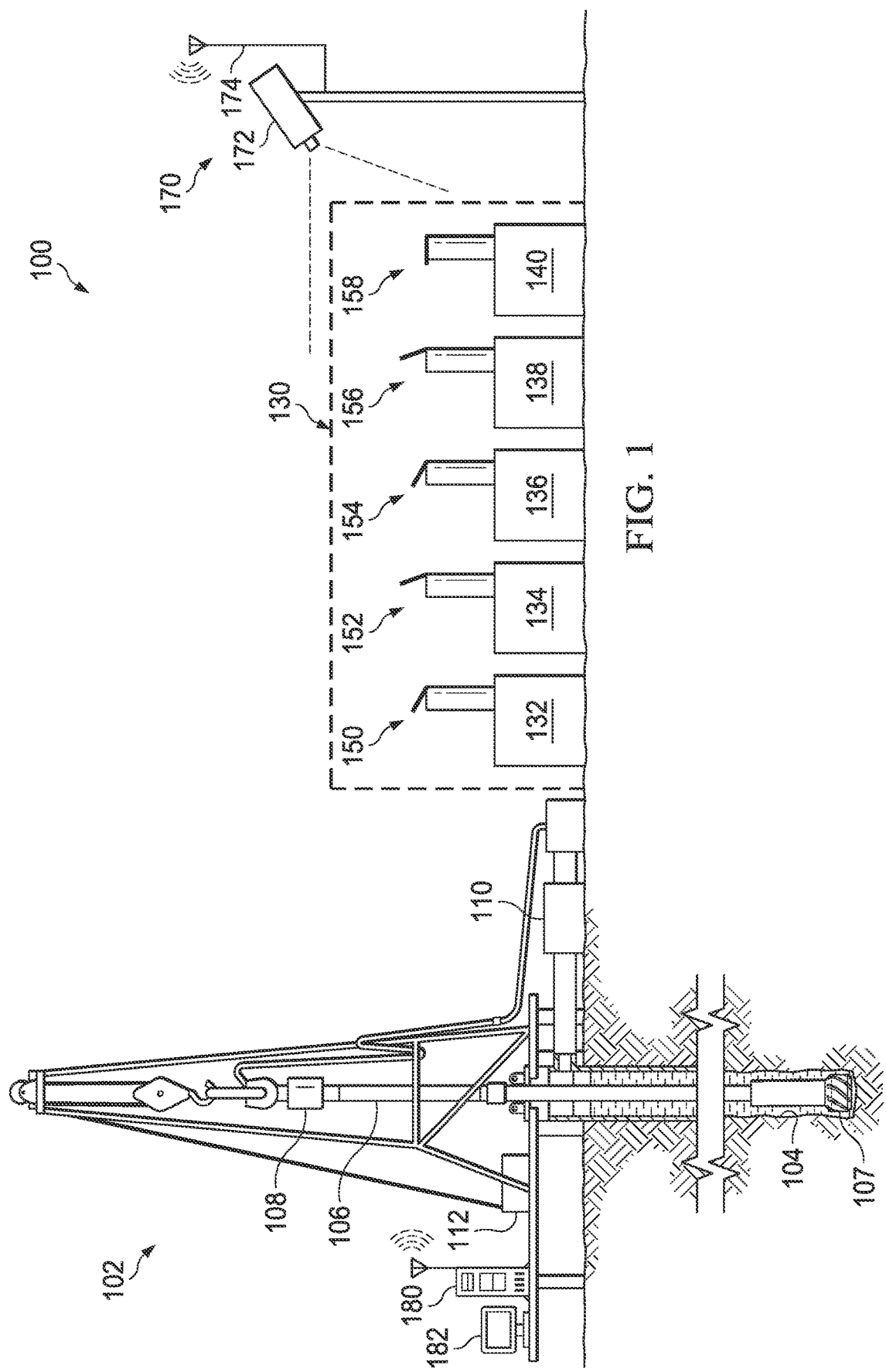
FIG. 1 is a drawing of an example rig power efficiency optimization system in accordance with an embodiment of the present disclosure.

FIG. 1 illustrates a rig power efficiency optimization system 100 in accordance with one embodiment of the present disclosure. System 100 includes drilling rig 102 which, in the illustrated embodiment, is a rotary land rig. However, the present disclosure is applicable to other types of drilling rigs (including top drive, power swivel, down hole motor, and coiled tubing units) and to offshore rigs (such as jack up rigs, semisubmersibles, and drill ships) that are operable to bore through the earth. In some embodiments, the optimization system may be applied to hydrocarbon production rigs or production platforms instead of, or in addition to, drilling rigs.

Drilling rig 102 includes a drill string 106 for drilling a wellbore 104. Drill string 106 can include multiple interconnected sections of drill pipe or coiled tubing and a bottom hole assembly (BHA) 107. The BHA 107 can include a rotary drilling bit, drill collars, measurement well drilling (MWD) instruments, and the like. Drilling is accomplished by applying weight to the BHA 107 and rotating the drill string 106, with drilling fluid (also known as mud) circulated down drill string, out BHA 107 at the bit, and back up wellbore 104 to lubricate the system, maintain wellbore stability, and carry away cuttings.

Several components of drilling rig 102 can require large amounts of power to operate. For example, in the illustrated embodiment, drilling rig 102 includes a draw works 112 which drives a cable which interconnects lifting gear to control the upward and downward movement of drill string 106. Top drive 108 is connected to an uphole end of drill string 106 and provides the rotation for drilling. Mud pumps 110 circulate the drilling fluid from mud tanks into the drill string and within wellbore 104. In an embodiment of the present disclosure, each of draw works 112, top drive 108, and mud pumps 110 are electrically powered. In addition, numerous smaller components of drilling rig 102 can add to the electrical power demand, including, for example, air pumps or other miscellaneous equipment required by rig crews or third-party contractors at the rig. Another component of rig power demand is the so-called "hotel load" which is associated with powering and maintaining workshops, offices, and accommodations associated with the rig, including lighting, heating, and air conditioning. In extremely hot or cold climates such hotel load power demand can be quite variable, daily and seasonally.

At a typical wellsite, electrical power needs are supplied by multiple on-site generators. In the illustrated embodiment, generator bank 130 comprises five generators: first generator 132, second generator 134, third generator 136, fourth generator 138, and fifth generator 140. Generator bank 130 provides the power for draw works 112, top drive 108, and mud pumps 110, and also for the hotel load associate with the rig and other miscellaneous equipment. The generators of generator bank 130 can comprise diesel-powered generators or other suitable generators. In some embodiments, generator bank 130 can include more or fewer generators; for example, in some embodiments, generator bank 130 includes only one generator.

Each generator of generator bank 130 has operational parameters which are measures of the operations of the generator in converting mechanical energy into electricity. An example of an operational parameter of the generator is the generator revolutions per minute (RPM), which is the frequency of rotation the engine crankshaft of the generator. Other examples of operational parameters of a generator can include fuel consumption or power output of the generator.

An operational parameter of a generator can be reflected in a visible state of the generator. For example, a generator operating at a high generator RPM may vibrate more than a generator that is operating at a lower generator RPM or not operating at all, and such difference in the amount of vibration may be visible to a camera or the naked eye. Similarly, a generator operating at a high generator RPM may produce a large amount of heat which raises the external temperature of the generator and such an external heat state of the generator can be visible to an infra-red camera.

In the illustrated embodiment, a visible state of the generators of generator bank 130 is the position of each of their respective exhaust flappers. Exhaust flappers (also known as rain caps) are hinged covers positioned on the end of a generator exhaust pipe that prevent precipitation and foreign objects from entering the exhaust system while still allowing exhaust flow to exit. Exhaust flappers are typically circular (to match a circular cross-section of the exhaust pipe) but can have other shapes or configurations. When an exhaust stream exits the exhaust pipe, the exhaust flapper is pushed by the force of the exhaust stream and pivots upwards on its hinge. When a generator is not operating, the exhaust flapper is in a horizontal, closed position. When a generator is operating at a highest or near-highest RPM, the more forceful stream of exhaust from the generator operating at such RPM can push the exhaust flapper upwards to a maximum open position, which is, in the illustrated embodiment, is a substantially vertical (or close to substantially vertical) position. When a generator is operating at an RPM somewhere between its highest RPM and its lowest RPM, the exhaust flapper can be pushed by the resulting exhaust stream upwards at an angle between such a maximum open (in the illustrated embodiment, substantially vertical (or close to substantially vertical)) position and the horizontal position. Thus, assuming the generators are of the same or similar design and are otherwise comparable, the relative position of the exhaust flappers in a set of generators can indicate the relative operational parameter (such as RPM) of the generators. (In some exhaust systems, the exhaust flapper is mechanically limited such that its highest mechanically possible position is at an angle somewhat less than vertical, and/or exhaust from a highest generator RPM may not be of sufficient strength to lift the exhaust flapper to a highest mechanically possible position; in such systems, a maximum open position in response to a highest RPM may not correspond to a vertical or to a highest mechanically possible position.)

As shown in FIG. 1, first exhaust flapper 150 on first generator 132 is at an angle between vertical and horizontal, but closer to horizontal, as a result of the exhaust stream from first generator 132 operating, but at a relatively low RPM. Third exhaust flapper 154 (on third generator 136) is at a similar angle as first exhaust flapper 150, as a result of the exhaust stream from third generator 136 operating at a similar RPM as first generator 132. Second exhaust flapper 152 and fourth exhaust flapper 156, on second generator 134 and fourth generator 138, respectively, are at a higher angle than first exhaust flapper 150 and third exhaust flapper 154, as a result of the exhaust streams of second generator 134 and fourth generator 138 operating at a higher RPM than first generator 132 and third generator 136. Finally, fifth exhaust flapper 158, on fifth generator 140, is in a horizontal position, as a result of generator 140 not operating (i.e., having zero RPM and thus no exhaust stream). Other operational parameters can also result in other changes to other visible states of a generator.

It is understood that, for a given RPM, the flapper will not sit statically in a single position but instead may bob up-and-down within a range. Stated more generally, the effects of an operational parameter (such as the exhaust stream for a given RPM) may not be completely steady but instead may be within a range, and therefore the visible state (such as exhaust flapper position) likewise may not be static for a given RPM or other performance metric, but instead will vary—such as by moving up and down within a range. The term "visible state" is therefore understood to mean not only an instantaneous visible state at a single point in time (such as the instantaneous position of the flapper at a single point in time) but also an average over time or other indication of the position, movement, direction, speed, temperature, vibration, or other state of a flapper or other component at a point in time or over a period of time. For example, images can be filtered and/or averaged over a time period such as a second or a minute or longer.

Camera system 170 includes camera 172 and transmitter 174, for example, one that can transmit data wirelessly or through wired connections or through a combination of them. In the illustrated embodiment, camera 172 is configured to capture video of a visible state of each of the generators of generator bank 130 (such as vertical position of exhaust flappers 150, 152, 154, 156, and 158). In the illustrated embodiment, camera 172 is configured such that it has clear line-of-sight view of exhaust flappers 150, 152, 154, 156, and 158. Camera 172 can be configured to capture video comprising a single image, and/or multiple images in a sequence, and/or a stream of images over a period of time. In the illustrated embodiment; camera 172 is a single camera; in some embodiments, camera system 170 can include multiple cameras; for example, one camera per generator of generator bank 130.

In the illustrated embodiment, camera 172 is a single high-resolution camera configured to capture images in the visible spectrum. In some embodiments, camera system 170 can be configured to capture other kinds of images and other spectra such as infrared, gamma ray, CT scan, and/or x-ray images. In some embodiments, camera 172 is positioned in a location at the rig site that is relatively vibration-free and/or positioned on vibration-damping equipment. In some embodiments, images captured by camera 172 can be processed to identify, reduce, or eliminate vibration.

Transmitter 174 is configured to transmit the image or images captured by camera 172 to computer system 180. Computer system 180 comprises one or more processors, and a computer-readable medium (for example, a non-transitory computer-readable medium) storing computer instructions executable by the one or more processors to perform operations. Computer system 180 can include an edge server or gateway. As described in further below in reference to FIGS. 2-6, computer system 180 can be configured to correlate the visible state(s) of one, some, or all of the generators of generator bank 130 to operational parameters, and to further correlate and compare such operational parameters to the current and historical power demands of the components of rig 102 and associated infrastructure and to assist an operator in optimizing such power supply and demand for the system, using machine learning, deep learning, and other techniques.

In some embodiments, camera system 170 can be configured to not only transmit image data but also receive control instructions or other data from computer system 180 or another source (to, for example, adjust the position, focus, direction, or other aspect of camera 172). Images and other data can be transmitted to and from camera system 170 and computer system 180 through wired or other connections, in addition to or instead of a wireless connection. Display unit 182 is configured to display output from computer system 180 and can include an LCD screen, tablet, smartphone screen, computer screen, or other suitable output device. In some embodiments, computer system 180 and/or display unit 182 can be at a remote location away from the wellsite. In some embodiments, computer system 180 and/or display unit 182 can be located at or near the wellsite and an additional (or multiple) computer system or systems and/or display unit or units can be at a remote location or locations and camera system 172 can send images to both or all of the computer systems.

Figure 2A:
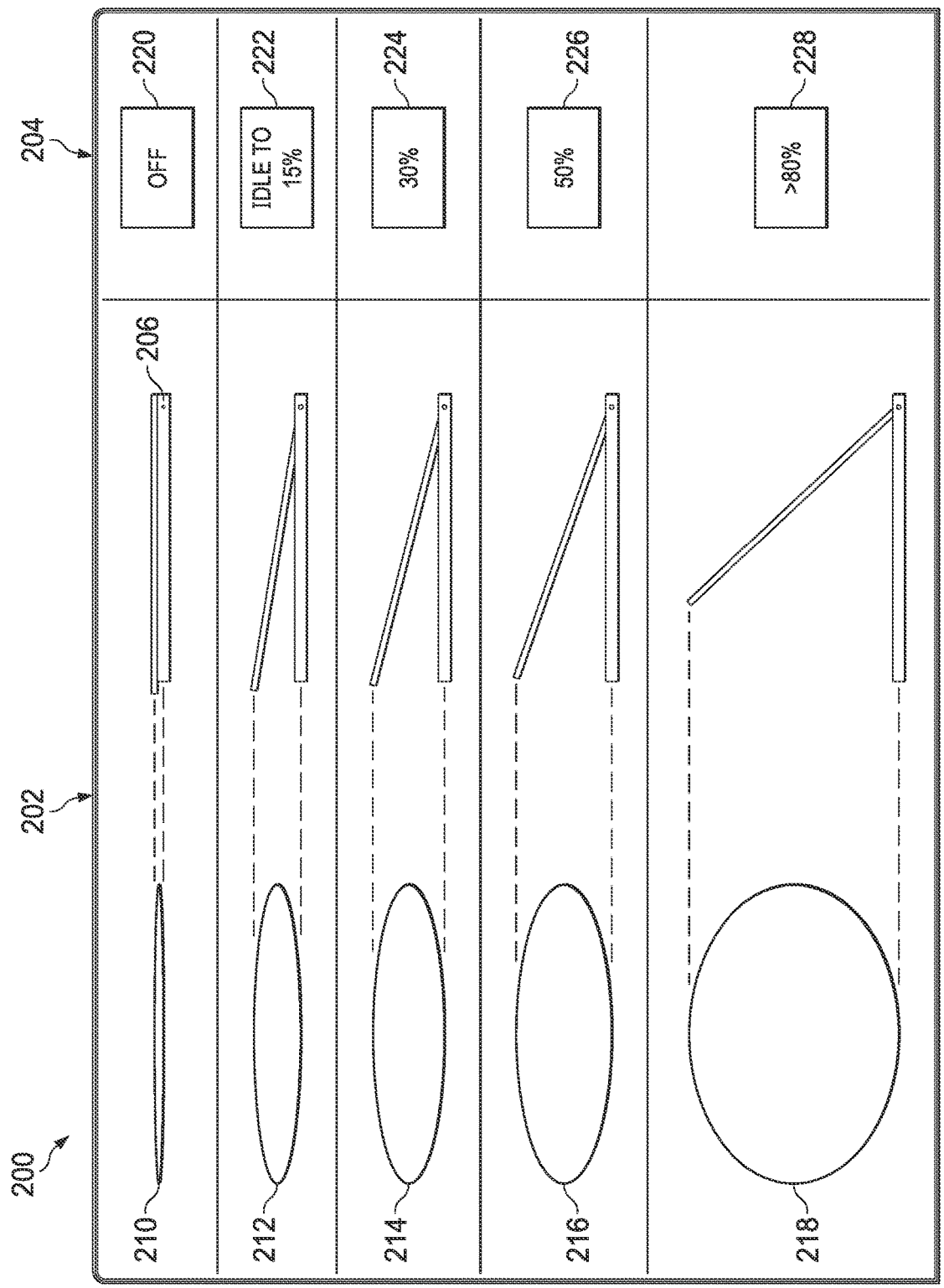
FIG. 2A is a drawing of example matrix of generator exhaust flapper positions correlated to operational parameters in accordance with an embodiment of the present disclosure.

FIG. 2A is a drawing of example matrix 200 of generator exhaust flapper positions correlated to operational parameters in accordance with an embodiment of the present disclosure. In an embodiment of the present disclosure, the operational parameters can be displayed by a display unit (such as display unit 182 of FIG. 1 or another suitable display unit).

Each of visible ovals 210, 212, 214, 216, and 218 shown in the cells of column 202 are examples of images of a circular exhaust flapper captured by a static camera (such as camera 172 of FIG. 1) placed within line-of-sight of the exhaust flapper at approximately the same horizontal level as the flapper and at an approximately right angle to hinge 206 of the flapper. Each of visible ovals 210, 212, 214, 216, and 218 correspond to a different relative position of the flapper as it raises from hinge 206 in response to an exhausts stream. A larger oval reflects a larger visible cross-sectional area which correlates to a higher position of the flapper due to a greater exhaust stream due to a higher RPM.

Column 204 illustrates operational parameters 220, 222, 224, 226, and 228, in this case a percentage of maximum generator RPM, for which a computer system has been trained to recognize as correlating to a visible state (in this case, the position of the exhaust flapper as indicated by visible ovals 210, 212, 214, 216, and 218, respectively), and for which the computer system causes the display unit to display. For example, first visible oval 210 represents only a small cross-sectional area visible to the camera because the flapper is in a horizontal (closed) or approximately horizontal position relative to the camera. The computer system can be trained to recognize that first visible oval 210 correlates to the generator being "off," and thus cause the unit to display first operational parameter 220 ("OFF"). Second visible oval 212 indicates a slightly larger visible cross-sectional area than first visible oval 210. The computer system can be trained to recognize that such second visible oval 212 corresponds to the generator operating at up to 15% of maximum RPM, and thus cause the display unit to display second operational parameter 222 ("Idle to 15%"). The computer system likewise can be trained to recognizes that third visible oval 214 corresponds to a generator operating at approximately 30% of maximum RPM, and thus cause the display unit to display third operational parameter 224 ("30%) The computer system can likewise be trained to recognized that fourth visible oval 216 corresponds to the generator operating at approximately 50% of maximum RPM, and thus cause the display unit to display fourth operational parameter 226 ("50%"). The computer system can likewise be trained to recognize that fifth visible oval 228 corresponds to the generator operating at greater than 80% maximum RPM, and thus cause the display unit to display fifth operational parameter 228 (">80%").

In an embodiment of the present disclosure, it is not necessary that the camera be positioned at an exact right angle to the hinge of the flapper for an accurate correlation, provided that some relative difference in cross-sectional areas is visible to the camera in response to the different relative positions of the flapper. Thus, for example, a camera might be placed at an approximately 45 degree angle relative to the hinge of the flapper or at some other suitable angle.

In an embodiment of the present disclosure, a computer system (such as computer system 180 of FIG. 1) can be trained using machine learning (ML) techniques, such as random forest (RF), artificial neural networks (ANN), decision trees (DT), among others, and/or deep learning (DL) techniques, such as convolutional neural networks (CNN), regional CNN (R-CNN), auto-encoder neural networks (AE-NN), among others, to recognize that visible states (such as exhaust flapper positions as revealed by visible cross-sectional areas as shown in FIG. 2A) correlate with specific operational parameters (such as a generator RPM or range of RPMs).

In order to determine the operational states such as those shown in column 204 of FIG. 2A, the computer system (such as computer system 180 of FIG. 1) can be trained using ML and/or DL models, using historical image data and historical measured operational parameter data to correlate a particular visible state to the operational parameter. Images can be converted to digital representations to be used as inputs to the ML/DL models. Received data can be time stamped or otherwise associated with points of time or periods of time corresponding to the images and/or operational parameter measurements. Data can be captured at a suitable frequency, such as multiple images and/or measurements per second or every five minutes or longer.

Shallow ML models (ANN, RF, DT, etc.) may be used to correlate the parameter measurements and the visible states from the captured images. For example, each frame of the video stream capturing the flapper is encoded into a vector of numerical features that characterizes the flapper in the captured image. In shallow ML models, the feature vector may be constructed from the image by using image processing techniques, such as pixilation, distance of flapper to closure pipe, among others. Additionally, DL models may be used to automatically determine the feature vectors that describe the flapper in the images. One dimensional vectors or 2-dimensional matrices by using CNN, R-CNN, or another suitable ML/DL model or image processing technique can be utilized. In an embodiment of the present disclosure, a vector or matrices containing the features extracted from the images along with the operational parameter(s) at a time (tn) represents a sample $S_{tn}$, such that $S_{tn}=\{x_1, x_2, \ldots, x_n\}:y_{tn}$ where $x_i$ represent the extracted features from the image of the visible state and $y_{tn}$ to the operational parameter, i.e., percentage (from 0 to 100%) of maximum generator RPM.

To provide an operator with the current or real-time operational parameter information, the trained computer system can receive an image of a current visible state of the generator, and determine the generational operational parameter associated with that current visible state based on the learning using the historical image data, and output to the operator the operational parameter information that has been correlated to that historical image data that matches the current visible state.

Figure 2B:
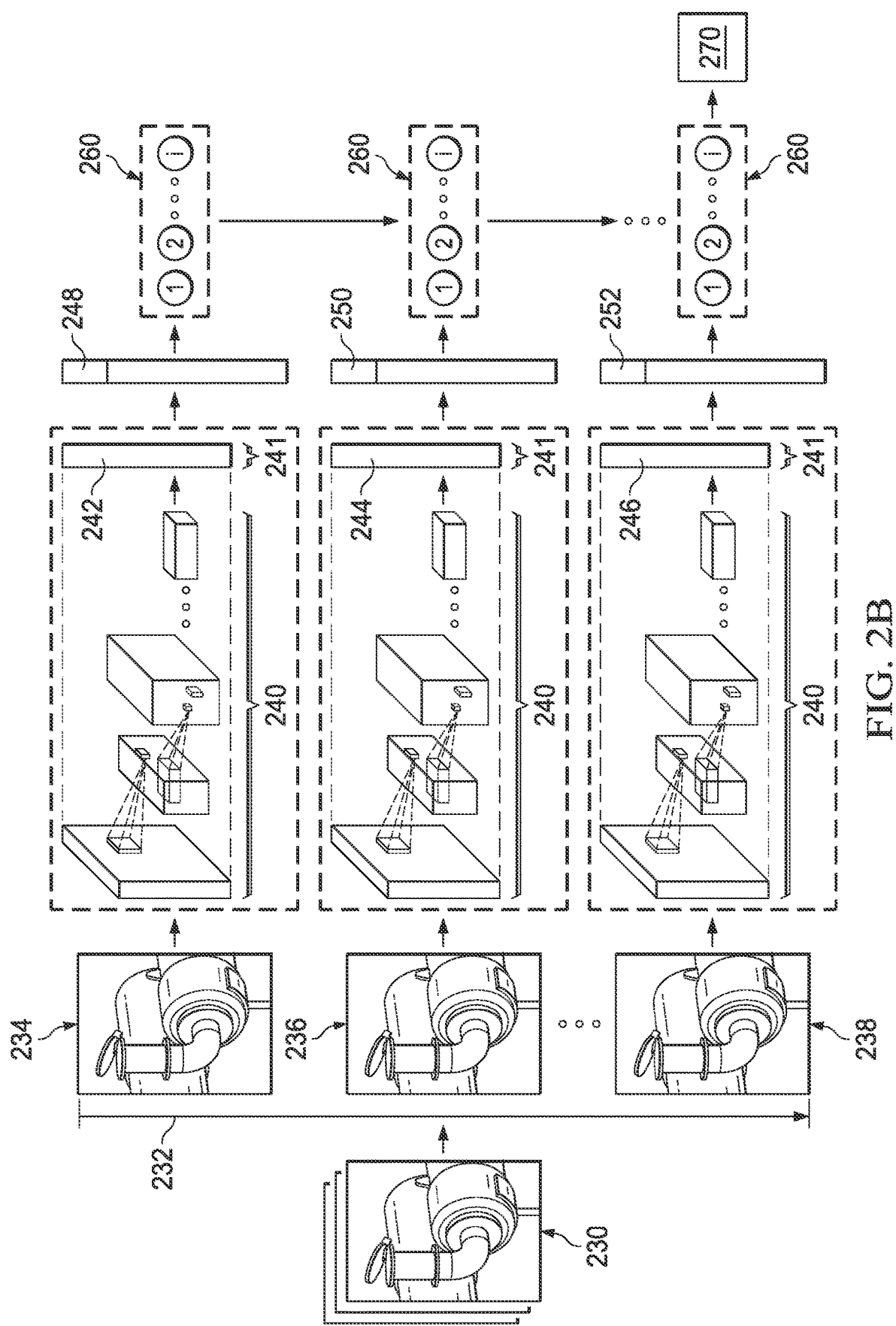
FIG. 2B is an illustration of the use of a convolutional neural network (CNN) used with time-series analysis to correlate an operational parameter of a generator with a visible state of the generator in accordance with an embodiment of the present disclosure.

Computational models for time-series analysis can be used to account for the changes in the visible state (such as flapper movements) over time. FIG. 2B is an illustration of the use of a convolutional neural network (CNN) used to with time-series analysis to correlate an operational parameter of a generator with a visible state of the generator; specifically, generator exhaust flapper positions, in accordance with an embodiment of the present disclosure.

Referring to FIG. 2B, a series 230 of image frames of a generator exhaust flapper (such as exhaust flapper 150 of generator 132 of FIG. 1) can be captured by a camera (such as camera 172 of FIG. 1). The series is captured over a time period 232. Time period 232 may be a fraction of a second, a second or many seconds (such as 5 seconds) or a minute or longer. Series 230 comprises a plurality of individual image frames, each captured at a specific time during time period 232 and in chronological order. For illustration purposes, three individual image frames 234, 236, and 238 of the series 230 are shown; however, it will be understood that series 230 may comprise tens or hundreds or more of individual image frames over time period 232 and that the correlation process shown in FIG. 2B (and explained in the remainder of this paragraph) can be applied to all of the individual frames of series 230 taken in chronological order over time period 232. Each individual image frame (illustrated in FIG. 2B by individual image frames 234, 236, and 238) of the series 230 is transformed into a respective abstract feature representation (illustrated in FIG. 2B by abstract feature representations 242, 244, and 246, respectively) using a CNN model 240 (or other DL model or image processing techniques) and a flattening process 241. As an alternative to CNN, other frameworks may use image processing techniques or DL models (AE-NN) for generating the abstract features. Each abstract feature representation (as illustrated, abstract feature representations 242, 244, and 246, corresponding to individual image frames 234, 236, and 238 respectively) is then concatenated with the respective operational parameter (such as generator RPM) observed as corresponding to the specific time (within time period 232) that the individual image frames were captured (as illustrated, operational parameters 248, 250, and 252 which are associated with the specific time within the time period 232 corresponding to the specific time that individual image frames 234, 236, and 238, respectively, were captured). Each abstract feature representation (as illustrated, abstract feature representations 242, 244, and 246) along with respective concatenated operational parameters (as illustrated, operational parameters 248, 250, and 252) is fed as input to a sequence model 260 (including recurrent neural network/long short term memory cells (RNN/LSTM)) with an output layer that makes a single value prediction of the operational parameter 270 (such as RPM or percent of maximum RPM) for time period 232.

Figure 3:
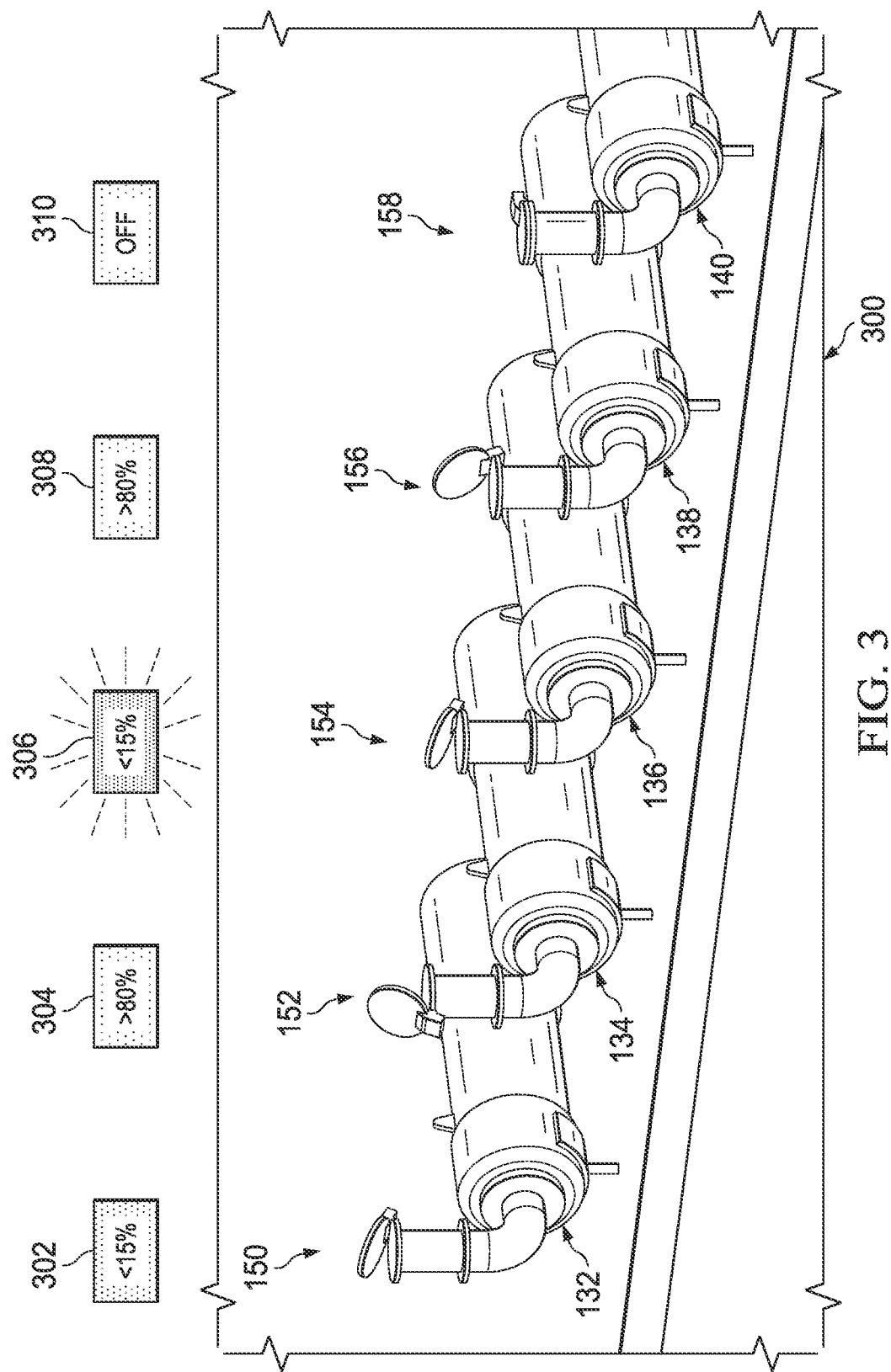
FIG. 3 is an illustration of operational parameters displayed by a display unit based on a video image of a generator bank in accordance with an embodiment of the present disclosure.

FIG. 3 is an illustration of operational parameters displayed by a display unit (such as display unit 182 of FIG. 1 or another suitable display unit) based on a video image of a generator bank in accordance with an embodiment of the present disclosure. Video image 300 of FIG. 3 is of generator bank 130 of FIG. 1, is captured by a camera such as camera 172 of FIG. 1. In video image 300, the positions of exhaust flappers 150, 152, 154, 156, and 158, corresponding to generators 132, 143, 136, 138, and 140, respectively, are visible. A computer system (such as computer system 182 of FIG. 1) can receive the images and, as discussed in more detail below, determine operational parameters 302, 304, 306, 308, and 310 (in the illustrated example the operational parameters being a percentage of maximum generator RPM) of the generators of the generator bank, and can cause the display unit to display operational parameters 302, 304, 306, 308, and 310 on the user interface of the display unit. In some embodiments, the user interface displays the operational parameters but not the video image; in other embodiments, the user interface can display both the video image and also the operational parameters. As further illustrated in FIG. 3 and explained below, operational parameter information based on the video image can be used to optimize the load of the generator bank.

In video image 300, first exhaust flapper 150 on first generator 132 is at an angle between vertical and horizontal, but closer to horizontal. Third exhaust flapper 154 (on third generator 136) is at a similar angle as first exhaust flapper 150. Second exhaust flapper 152 and fourth exhaust flapper 156, on second generator 134 and fourth generator 138, respectively, are at a higher angle than first exhaust flapper 150 and third exhaust flapper 154. Finally, fifth exhaust flapper 158, on fifth generator 140, is in a horizontal position.

In an embodiment of the present disclosure, a computer system (such as computer system 180 of FIG. 1) is configured to receive the video image 300 and determine the operational parameter based on the visible state, in this case the position of the flappers, and to provide output in the form of correlated operational parameters 302, 304, 306, 308, and 310 (corresponding to generators 132, 143, 136, 138, and 140, respectively).

In the illustrated embodiment, the position of first exhaust flapper 150 and third exhaust flapper 154 have correlated operational parameters 302 and 306 of 15% or less of the maximum generator RPM of generators 132 and 136, respectively. The position of second exhaust flapper 152 and fourth exhaust flapper 156 have correlated operational parameters 304 and 308 of 80% or greater of the maximum generator RPM of generators 134 and 138, respectively. The position of fifth exhaust flapper 158 has a correlated operational parameter 310 indicating "off," indicating that generator 140 is not operating (i.e., has zero RPM).

The power availability status of the generator bank can be determined from the operational parameter information corresponding to each of the generators in the generator bank. In some embodiments, the power availability status of a generator bank is the percentage of the maximum of a given operational parameter (and/or, expressed inversely, a percentage of a remaining capacity such as power output capacity) of each of the generators of the generator bank at a particular time (or over a period of time). For example, for the generator bank shown operating in FIG. 3, the power availability status consists of two generators operating at high RPM, two generators operating at low RPM, and one generator not operating. In this example, it is efficient for two generators—generators 134 and 138—to be running at a high RPM (80% or greater of maximum RPM), and for another generator (for example, generator 132), to be on active standby in idle (15% or less of maximum RPM). However, having a second generator also idling (for example, generator 136 as indicated by operational parameter 306) is inefficient and not required. Therefore, the power availability status of the generator bank indicates that the generator bank is not operating at maximum efficiency. Thus, in the illustrated embodiment, the computer system to determine the power availability status of the generator bank, recognize the potentially inefficient condition, and flag the operational parameter (in the illustrated example, operational parameter 306) as an action alarm, indicating (in the illustrated example) an unnecessary operating generator, using a flashing icon, color coding, or another suitable method. The operator can then take corrective action such as shutting down the unnecessary generator 136. The operator can thus optimize the power efficiency of the rig equipment system.

In the embodiments shown in FIGS. 1-3, the operational parameter that is correlated to the visible state is generator RPM. In some embodiments of the present disclosure, the operational parameter correlated to the visible state (and/or utilized for determining and/or expressing power availability status of a generator bank) can comprise another operational parameter of the generator (such as fuel consumption, emissions, or power output) instead of or in addition to RPM or an operational parameter of another piece of equipment of the rig system instead of or in addition to generators. In some embodiments, more than one operational parameter can be correlated to a visible state or states.

In an embodiment of the present disclosure, the computer system not only receives visible state information and correlates that information with operational parameters associated with power supply but also receives and processes information regarding power demand of the different components of the rig system. For example, the power demand of the mud pumps can be determined from the strokes per minute and/or total strokes of the mud pumps. The power demand of the draw works can be determined from the hook load and/or hook position. The power demand of the top drive can be determined from the string torque or string RPM. Such demand data can be outputted to the display unit alongside the operational parameters of the generator so as to enable the operator to optimize power usage for the rig system. Such demand data can be obtained via an existing conventional rig instrumentation and data network(s), or may be generated through camera/visual capture and analysis (e.g. Edge) methods, independent of the conventional rig equipment.

Figure 4:
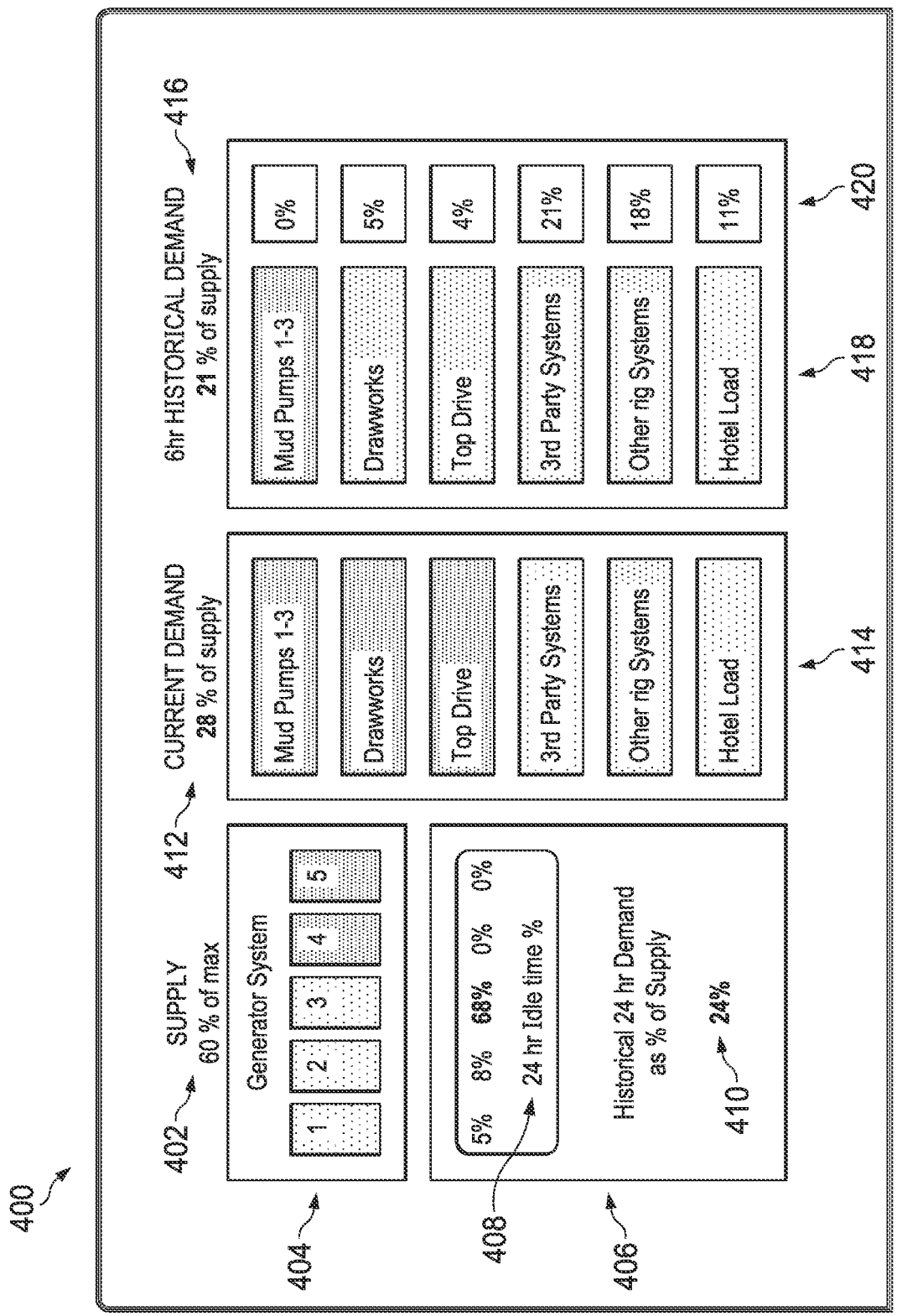
FIG. 4 is a drawing of an example graphical user interface (GUI) for a rig power efficiency optimization system in accordance with an embodiment of the present disclosure.

FIG. 4 is a drawing of an example graphical user interface (GUI) 400 for a rig power efficiency optimization system in accordance with an embodiment of the present disclosure. As described above in reference to FIGS. 1-3, a computer system (such as computer system 180 of FIG. 1) can correlate one or more visible states of one or more generators and correlate the visible states to one or more operational parameters, and the computer system can cause a display unit (such as display unit 182 of FIG. 1) to display GUI 400 GUI 400 provides the operator with real-time and historical operational parameter information and demand information which can be readily and easily viewed, analyzed and compared to optimize the generator load and power usage of a drilling or production rig system.

GUI 400 includes a power supply indication object (or field) 402 in which the computer system displays information regarding the overall power supply. In the illustrated embodiment, the overall power supply is displayed as a percentage of the maximum available power from the generator bank.

In the illustrated embodiment, GUI 400 further includes a generator bank grid object (or field) 404 in which the computer system displays information regarding which generators are operating and, for each generator, at what percentage of maximum RPM, based on the visible state of the generator components as described above in reference to FIGS. 1-3. In some embodiments, the individual generator icons can be color coded or otherwise tagged with operational indications. In the illustrated embodiment, the GUI highlights three generators (with different shading) as operating at the current time, and two generators are not operating. In some embodiments, such indications can be color coded (for example, red=non-operational, green=operating).

In the illustrated embodiment, GUI 400 further includes idle time indication object (or field) 402 in which the computer system displays information regarding the amount of time each generator has been idle during a relevant period of time. In the illustrated embodiment, the amount of idle time as a percentage of the last 24 hours is provided. Generally, for optimized efficiency, the amount of idle time should be minimized.

In the illustrated embodiment, GUI 400 further includes a demand efficiency indication object (or field) 410, in which the computer system displays information regarding the historical 24-hour power demand as a percentage of powers supply. A greater percentage generally indicates a more efficient operation.

In the illustrated embodiment, GUI 400 further includes a current demand indication object (or field) 412 in which the computer system displays information regarding the current or spot demand as a percent of supply, which can serve as a measure of instantaneous efficiency. A higher percentage of supply is indicative of more efficient operations.

In the illustrated embodiment, GUI 400 further includes major system current demand indication object (or field) 414 in which the computer system displays information regarding the operational status of the major rig systems which draw electrical power from the generator bank, including (for example) the mud pumps, the draw works, the top drive, third-party systems, other (miscellaneous) systems, and the hotel load. In the illustrated embodiment, the GUI highlights that the mud pumps, draw works, and top drive are not operating at the current time, whereas the other systems are shown (with different shading) as operating. In some embodiments, such indications can be color coded (for example, red=non-operational, green=operating). The GUI can show more detailed information such as percentage of maximum performance (as measured by, for example, total strokes or torque or other parameters).

In the illustrated embodiment, GUI 400 further includes a 6-hour historical demand indication object (or field) 416 in which the computer system displays information regarding the total historical demand over the prior six hours as a percentage of supply. Higher percentage is indicative of more efficient operations.

In the illustrated embodiment, GUI 400 further includes major system historical demand indication object (or field) 418 in which the computer system displays information regarding the 6-hour historical demand of the major rig systems which draw electrical power from the generator bank, including (for example) the mud pumps, the draw works, the top drive, third-party systems, other (miscellaneous) systems, and the hotel load.

In the illustrated embodiment, GUI 400 further includes major system historical demand percentage indications object (or field) 420 in which the computer system displays historical demand, as % of supply, of each of the major rig systems which draw electrical power from the generator bank. A higher historical demand percentage is indicative of more efficient operations.

In embodiments of the present disclosure, a suitable GUI can further include other objects or fields which display information useful to the operator to optimize the power generated and used by the rig system, and machine learning can be used to provide recommendations based on that information. For example, a suitable GUI can provide information on key performance metrics such as the amount of diesel fuel used and/or the amount of carbon dioxide and/or nitrogen oxide and/or particular matter emissions. A suitable GUI can further include a percentage of the maximum possible power supply and/or alerts and recommendations regarding power utilization strategies. A suitable GUI can further include a correlation from the computer system of power supply and/or demand with drilling activity. A suitable GUI can further include a comparison of with other rigs in the rig fleet. A suitable GUI can further include recommendations for technology upgrades to optimize diesel usage and minimize emissions and maintenance costs.

Figure 5:
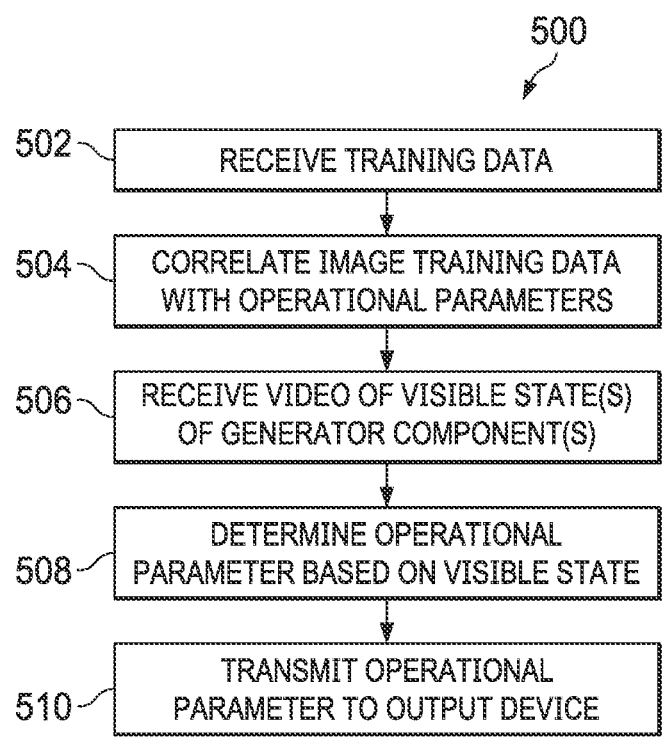
FIG. 5 is a process flow diagram of a method of determining an operational parameter in accordance with an embodiment of the present disclosure.

FIG. 5 is a process flow diagram of a method 500 of determining an operational parameter in accordance with an embodiment of the present disclosure.

Method 500 begins with block 502 wherein the computer system receives training data. The training data can include historical images of a visible state of a component of a generator in a generator bank. For example, as described above in reference to FIGS. 1-3, data can include vertical positions of a generator exhaust flapper as indicated by a visible cross-sectional area of the flapper at a point in time or over a period of time. The training data can also include historical measurements of operational parameters such as generator RPM at that time or over a period of time.

Proceeding to block 504, the computer system is trained using the historical image data to associate a visible state with an operational parameter such as generator RPM. Such training can utilize machine learning or deep learning models as described above in reference to FIG. 2A.

Proceeding to block 506, the computer system receives video image or images of the visible state of the generator components is received, such as real-time or current images. At block 508, an operational parameter (such as generator RPM) is determined for that visible state, as described in reference to FIGS. 2 and 3. At block 510, the computer system transmits the operational parameter to an output device. As described in reference to FIG. 4, the output device can display the operational parameter results alongside other operational information such as demand data so as to allow the operator to optimize the power efficiency of the drilling rig system.

Although certain embodiments of the present disclosure are described in reference to rigs for hydrocarbon drilling or production and their associated equipment, the systems, apparatus, and methods of the present disclosure can also be used for other systems that utilize generators to power equipment (instead of or in addition to rigs for hydrocarbon drilling or production), including to determine operational parameters of generators of, to determine the power availability status of generator banks of, and to optimize power efficiency of equipment systems of, such other systems.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" or "substantially" means a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A method comprising:
   receiving, by a computer system configured to implement a machine learning model, a video of a visible state of a component of a generator, the generator powering at least a portion of a rig equipment system at a wellsite;

determining, by the computer system, an operational parameter based on the visible state of the component of the generator imaged in the video, the determining the operational parameter comprises:

receiving, by the machine learning model, training data comprising historical images of the visible state of the component of the generator and historical measured operational parameters;

correlating, by the machine learning model, the historical images with corresponding historical measured operational parameters; and determining, by the machine learning model, the operational parameter based on a comparison of the video of the visible state with the historical images; and transmitting, by the computer system, the operational parameter to an output device.

2. The method of claim 1, wherein the operational parameter is a percentage of a maximum revolutions-per-minute (RPM) of the generator.

3. The method of claim 1, wherein the component of the generator is an exhaust flapper, and the visible state is a position of the exhaust flapper moving in response to an exhaust stream from the generator.

4. The method of claim 3, wherein the positon of the exhaust flapper is determined based on a visible cross-sectional area of the exhaust flapper.

5. The method of claim 1, wherein the generator is included in a generator bank comprising a plurality of generators, each comprising a respective component, the generator bank powering at least the portion of the rig equipment system at the wellsite, wherein the method further comprises:

receiving, by the computer system, a video of a plurality of visible states, the plurality of visible states comprising a visible state of the respective component of each of the plurality of generators;

determining, by the computer system, a respective operational parameter for each of the generators based on the plurality of visible states; and determining, by the computer, a power availability status of the generator bank based on the respective operational parameter of each of the plurality of generators.

6. The method of claim 5, further comprising:

determining, by the computer system, power demand parameters of a plurality of components of the portion of the rig equipment system;

transmitting, by the computer system, the power availability status of the generator bank and the power demand parameters to the output device; and optimizing a power efficiency of the rig equipment system based on the power availability status of the generator bank and the power demand parameters.

7. The method of claim 1, wherein a camera is disposed at or proximate to the wellsite; and further comprising:

capturing, by a camera, the video; and
transmitting the video to the computer system.

8. The method of claim 7, wherein the transmitting is via a wireless connection.

9. The method of claim 1, wherein the video comprises multiple images in sequence of the visible state of the component of the generator.

10. A system for optimizing the efficiency of a rig equipment system at a wellsite, the system comprising:

a camera configured to capture a video of a visible state of a component of a generator, the generator powering at least a portion of the rig equipment system; and a computer system comprising one or more processors and a non-transitory computer-readable medium storing computer instructions executable by the one or more processors to perform operations, wherein the computer system is configured to implement a machine learning model and wherein the operations comprise:

receiving the video of the visible state of the component of a generator;

determining an operational parameter based on the visible state of the component of the generator imaged in the video; and transmitting the operational parameter to an output device, wherein the machine learning model is configured to:

receive training data comprising historical images of the visible state of the component of the generator and historical measured operational parameters; and correlate the historical images with corresponding historical measured operational parameters;

and wherein the determining the operational parameter based on the visible state comprises determining the operational parameter based on a comparison of the video of the visible state with the historical images.

11. The system of claim 10, wherein the operational parameter is a percentage of a maximum revolutions-per-minute (RPM) of the generator.

12. The system of claim 10, wherein the component of the generator is an exhaust flapper, and the visible state is a position of the exhaust flapper moving in response to an exhaust stream from the generator.

13. The system of claim 12, wherein the position of the exhaust flapper is determined based on a visible cross-sectional area of the exhaust flapper.

14. The system of claim 10, wherein the generator is included in a generator bank comprising a plurality of generators, each comprising a respective component, the generator bank powering at least the portion of the rig equipment system at the wellsite, wherein the operations further comprise:

receiving a video of a plurality of visible states, the plurality of visible states comprising a visible state of the respective component of each of the plurality of generators;

determining a respective operational parameter for each of the generators based on the plurality of visible states; and determining a power availability status of the generator bank based on the respective operational parameter of each of the plurality of generators.

15. The system of claim 14, wherein the operations further comprise:

determining power demand parameters of a plurality of components of the portion of the rig equipment system; and transmitting the power availability status of the generator bank and the power demand parameters to the output device.

16. The system of claim 15, wherein the output device comprises a display screen with a graphical user interface configured to display the power availability status of the generator bank and the power demand parameters of the plurality of components of the portion of the rig equipment system.

17. The system of claim 10, wherein the video comprises multiple images in sequence of the visible state of the component of the generator.

18. The system of claim 10, wherein the camera is configured to wirelessly transmit the video to the computer system.

19. A method comprising:
receiving, by a computer system, a video of a visible state of a component of a generator, the generator powering at least a portion of a rig equipment system at a wellsite, wherein the component of the generator is an exhaust flapper, and the visible state is a position of the exhaust flapper moving in response to an exhaust stream from the generator;
determining, by the computer system, an operational parameter based on the visible state of the component of the generator imaged in the video; and
transmitting, by the computer system, the operational parameter to an output device.

20. A method comprising:
receiving, by a computer system, a video of a plurality of visible states, the plurality of visible states comprising a visible state of a respective component of each of a plurality of generators of a generator bank powering at least a portion of a rig equipment system at a wellsite;
determining, by the computer system, a respective operational parameter for each of the generators based on the plurality of visible states;
determining, by the computer, a power availability status of the generator bank based on the respective operational parameter of each of the plurality of generators; and
transmitting, by the computer system, the power availability status of the generator bank.

21. The method of claim 20, further comprising:
determining, by the computer system, power demand parameters of a plurality of components of the portion of the rig equipment system;
transmitting, by the computer system, the power availability status of the generator bank and the power demand parameters to the output device; and
optimizing a power efficiency of the rig equipment system based on the power availability status of the generator bank and the power demand parameters.

22. A system for optimizing the efficiency of a rig equipment system at a wellsite, the system comprising:
a camera configured to capture receiving a video of a plurality of visible states, the plurality of visible states comprising a visible state of a respective component of each of a plurality of generators of a generator bank comprising a plurality of generators, the generator bank powering at least the portion of the rig equipment system at the wellsite; and
a computer system comprising one or more processors and a non-transitory computer-readable medium storing computer instructions executable by the one or more processors to perform operations comprising:
receiving the video of the plurality of visible states, the plurality of visible states comprising a visible state of the respective component of each of the plurality of generators;
determining a respective operational parameter for each of the generators based on the plurality of visible states;
determining a power availability status of the generator bank based on the respective operational parameter of each of the plurality of generators; and
transmitting the power availability status to an output device.

23. The system of claim 22, wherein the operations further comprise:
determining power demand parameters of a plurality of components of the portion of the rig equipment system; and
transmitting the power demand parameters to the output device.

* * * * *

UNITED STATES PATENT AND TRADEMARK OFFICE
CERTIFICATE OF CORRECTION

| | |
|---|---|
| PATENT NO. | : 11,727,555 B2 |
| APPLICATION NO. | : 17/185688 |
| DATED | : August 15, 2023 |
| INVENTOR(S) | : Michael Affleck et al. |

It is certified that error appears in the above-identified patent and that said Letters Patent is hereby corrected as shown below:

In the Claims

In Column 15, Line 27, Claim 4, replace "positon" with -- position --.

Signed and Sealed this
Twenty-eighth Day of November, 2023

Katherine Kelly Vidal
*Director of the United States Patent and Trademark Office*